United States Patent
Richardson et al.

(10) Patent No.: US 9,451,046 B2
(45) Date of Patent: *Sep. 20, 2016

(54) MANAGING CDN REGISTRATION BY A STORAGE PROVIDER

(71) Applicant: Amazon Technologies, Inc., Reno, NV (US)

(72) Inventors: David R. Richardson, Seattle, WA (US); Bradley Eugene Marshall, Bainbridge Island, WA (US); Swaminathan Sivasubramanian, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 559 days.

This patent is subject to a terminal disclaimer.

(21) Appl. No.: 13/948,087

(22) Filed: Jul. 22, 2013

(65) Prior Publication Data

US 2013/0311605 A1    Nov. 21, 2013

Related U.S. Application Data

(63) Continuation of application No. 13/620,945, filed on Sep. 15, 2012, now Pat. No. 8,495,220, which is a continuation of application No. 13/296,156, filed on Nov. 14, 2011, now Pat. No. 8,301,748, which is a continuation of application No. 12/272,666, filed on Nov. 17, 2008, now Pat. No. 8,060,616.

(51) Int. Cl.
*G06F 15/16* (2006.01)
*H04L 29/08* (2006.01)
(Continued)

(52) U.S. Cl.
CPC ........ *H04L 67/32* (2013.01); *G06F 17/30893* (2013.01); *H04L 29/06* (2013.01);
(Continued)

(58) Field of Classification Search
CPC .................................................. H04L 67/1002
USPC .................................................. 709/217, 226
See application file for complete search history.

(56) References Cited

U.S. PATENT DOCUMENTS 5,063,500 A    11/1991  Shorter
5,341,477 A    8/1994   Pitkin et al.
(Continued)

FOREIGN PATENT DOCUMENTS

CA    2741 895 A1    5/2010
CN    1422468 A      6/2003
(Continued)

OTHER PUBLICATIONS

Office Action in Japanese Application No. 2014-225580 dated Oct. 26, 2015.
(Continued)

*Primary Examiner* — Imad Hussain
(74) *Attorney, Agent, or Firm* — Knobbe Martens Olson & Bear LLP

(57) ABSTRACT

A system, method, and computer readable medium for managing registration, by a network storage provider, of one or more resources with a CDN service provider are provided. A network storage provider storing one or more resources on behalf of a content provider obtains registration information for registering the one or more resources with a CDN service provider. The registration information may include a request to publish one or more resources to a CDN service provider, an identification of the one or more resources, CDN selection criteria provided by the content provider or otherwise selected, and the like. The network storage provider transmits a CDN generation request corresponding to the registration information to the CDN service provider. Then, the network storage provider manages and processes data pursuant to registration of the one or more resources with the CDN service provider.

25 Claims, 8 Drawing Sheets

(51) Int. Cl.
  *G06F 17/30* (2006.01)
  *H04L 29/06* (2006.01)
  *H04L 29/12* (2006.01)
(52) U.S. Cl.
  CPC ....... *H04L67/1002* (2013.01); *H04L 67/1029* (2013.01); *H04L 67/1097* (2013.01); *H04L 29/12066* (2013.01); *H04L 61/1511* (2013.01); *H04L 67/1031* (2013.01)

(56) References Cited

U.S. PATENT DOCUMENTS

| | | |
|---|---|---|
| 5,459,837 A | 10/1995 | Caccavale |
| 5,611,049 A | 3/1997 | Pitts |
| 5,701,467 A | 12/1997 | Freeston |
| 5,764,910 A | 6/1998 | Shachar |
| 5,774,660 A | 6/1998 | Brendel et al. |
| 5,852,717 A | 12/1998 | Bhide et al. |
| 5,892,914 A | 4/1999 | Pitts |
| 5,893,116 A | 4/1999 | Simmonds et al. |
| 5,895,462 A | 4/1999 | Toki |
| 5,933,811 A | 8/1999 | Angles et al. |
| 5,937,427 A | 8/1999 | Shinagawa et al. |
| 5,974,454 A | 10/1999 | Apfel et al. |
| 5,991,306 A | 11/1999 | Burns et al. |
| 6,016,512 A | 1/2000 | Huitema |
| 6,026,452 A | 2/2000 | Pitts |
| 6,038,601 A | 3/2000 | Lambert et al. |
| 6,052,718 A | 4/2000 | Gifford |
| 6,078,960 A | 6/2000 | Ballard |
| 6,085,234 A | 7/2000 | Pitts et al. |
| 6,092,100 A | 7/2000 | Berstis et al. |
| 6,098,096 A | 8/2000 | Tsirigotis et al. |
| 6,108,703 A | 8/2000 | Leighton et al. |
| 6,128,279 A | 10/2000 | O'Neil et al. |
| 6,157,942 A | 12/2000 | Chu et al. |
| 6,167,438 A | 12/2000 | Yates et al. |
| 6,167,446 A | 12/2000 | Lister et al. |
| 6,182,111 B1 | 1/2001 | Inohara et al. |
| 6,182,125 B1 | 1/2001 | Borella et al. |
| 6,185,598 B1 | 2/2001 | Farber et al. |
| 6,192,051 B1 | 2/2001 | Lipman et al. |
| 6,205,475 B1 | 3/2001 | Pitts |
| 6,223,288 B1 | 4/2001 | Byrne |
| 6,243,761 B1 | 6/2001 | Mogul et al. |
| 6,275,496 B1 | 8/2001 | Burns et al. |
| 6,286,043 B1 | 9/2001 | Cuomo et al. |
| 6,286,084 B1 | 9/2001 | Wexler et al. |
| 6,304,913 B1 | 10/2001 | Rune |
| 6,324,580 B1 | 11/2001 | Jindal et al. |
| 6,330,602 B1 | 12/2001 | Law et al. |
| 6,338,082 B1 | 1/2002 | Schneider |
| 6,345,308 B1 | 2/2002 | Abe |
| 6,351,743 B1 | 2/2002 | DeArdo et al. |
| 6,351,775 B1 | 2/2002 | Yu |
| 6,363,411 B1 | 3/2002 | Dugan et al. |
| 6,366,952 B2 | 4/2002 | Pitts |
| 6,374,290 B1 | 4/2002 | Scharber et al. |
| 6,377,257 B1 | 4/2002 | Borrel et al. |
| 6,386,043 B1 | 5/2002 | Millins |
| 6,405,252 B1 | 6/2002 | Gupta et al. |
| 6,408,360 B1 | 6/2002 | Chamberlain et al. |
| 6,411,967 B1 | 6/2002 | Van Renesse |
| 6,415,280 B1 | 7/2002 | Farber et al. |
| 6,430,607 B1 | 8/2002 | Kavner |
| 6,438,592 B1 | 8/2002 | Killian |
| 6,442,165 B1 | 8/2002 | Sitaraman et al. |
| 6,452,925 B1 | 9/2002 | Sistanizadeh et al. |
| 6,457,047 B1 | 9/2002 | Chandra et al. |
| 6,459,909 B1 | 10/2002 | Bilcliff et al. |
| 6,473,804 B1 | 10/2002 | Kaiser et al. |
| 6,484,143 B1 | 11/2002 | Swildens et al. |
| 6,493,765 B1 | 12/2002 | Cunningham et al. |
| 6,505,241 B2 | 1/2003 | Pitts |
| 6,523,036 B1 | 2/2003 | Hickman et al. |
| 6,529,910 B1 | 3/2003 | Fleskes |
| 6,529,953 B1 | 3/2003 | Van Renesse |
| 6,553,413 B1 | 4/2003 | Leighton et al. |
| 6,560,610 B1 | 5/2003 | Eatherton et al. |
| 6,611,873 B1 | 8/2003 | Kanehara |
| 6,622,168 B1 | 9/2003 | Datta |
| 6,643,357 B2 | 11/2003 | Lumsden |
| 6,643,707 B1 | 11/2003 | Booth |
| 6,654,807 B2 | 11/2003 | Farber et al. |
| 6,658,462 B1 | 12/2003 | Dutta |
| 6,665,706 B2 | 12/2003 | Kenner et al. |
| 6,678,717 B1 | 1/2004 | Schneider |
| 6,678,791 B1 | 1/2004 | Jacobs et al. |
| 6,681,282 B1 | 1/2004 | Golden et al. |
| 6,694,358 B1 | 2/2004 | Swildens et al. |
| 6,697,805 B1 | 2/2004 | Choquier et al. |
| 6,724,770 B1 | 4/2004 | Van Renesse |
| 6,732,237 B1 | 5/2004 | Jacobs et al. |
| 6,754,699 B2 | 6/2004 | Swildens et al. |
| 6,754,706 B2 | 6/2004 | Swildens et al. |
| 6,760,721 B1 | 7/2004 | Chasen et al. |
| 6,769,031 B1 | 7/2004 | Bero |
| 6,782,398 B1 | 8/2004 | Bahl |
| 6,785,704 B1 | 8/2004 | McCanne |
| 6,795,434 B1 | 9/2004 | Kumar et al. |
| 6,799,214 B1 | 9/2004 | Li |
| 6,804,706 B2 | 10/2004 | Pitts |
| 6,810,291 B2 | 10/2004 | Card et al. |
| 6,810,411 B1 | 10/2004 | Coughlin et al. |
| 6,829,654 B1 | 12/2004 | Jungck |
| 6,862,607 B1 | 3/2005 | Vermeulen |
| 6,874,017 B1 | 3/2005 | Inoue et al. |
| 6,917,951 B2 | 7/2005 | Orbits et al. |
| 6,928,467 B2 | 8/2005 | Peng et al. |
| 6,928,485 B1 | 8/2005 | Krishnamurthy et al. |
| 6,941,562 B2 | 9/2005 | Gao et al. |
| 6,963,850 B1 | 11/2005 | Bezos et al. |
| 6,976,090 B2 | 12/2005 | Ben-Shaul et al. |
| 6,981,017 B1 | 12/2005 | Kasriel et al. |
| 6,985,945 B2 | 1/2006 | Farhat et al. |
| 6,986,018 B2 | 1/2006 | O'Rourke et al. |
| 6,990,526 B1 | 1/2006 | Zhu |
| 6,996,616 B1 | 2/2006 | Leighton et al. |
| 7,003,555 B1 | 2/2006 | Jungck |
| 7,006,099 B2 | 2/2006 | Gut et al. |
| 7,007,089 B2 | 2/2006 | Freedman |
| 7,010,578 B1 * | 3/2006 | Lewin ............... G06F 17/30905 707/E17.121 |
| 7,010,598 B2 | 3/2006 | Sitaraman et al. |
| 7,024,466 B2 | 4/2006 | Outten et al. |
| 7,031,445 B2 | 4/2006 | Lumsden |
| 7,032,010 B1 | 4/2006 | Swildens et al. |
| 7,058,706 B1 | 6/2006 | Iyer et al. |
| 7,058,953 B2 | 6/2006 | Willard et al. |
| 7,065,587 B2 | 6/2006 | Huitema et al. |
| 7,072,982 B2 | 7/2006 | Teodosiu et al. |
| 7,076,633 B2 | 7/2006 | Tormasov et al. |
| 7,082,476 B1 | 7/2006 | Cohen et al. |
| 7,086,061 B1 | 8/2006 | Joshi et al. |
| 7,092,505 B2 | 8/2006 | Allison et al. |
| 7,092,997 B1 | 8/2006 | Kasriel et al. |
| 7,096,266 B2 | 8/2006 | Lewin et al. |
| 7,099,936 B2 | 8/2006 | Chase et al. |
| 7,103,645 B2 | 9/2006 | Leighton et al. |
| 7,114,160 B2 | 9/2006 | Suryanarayana et al. |
| 7,117,262 B2 | 10/2006 | Bai et al. |
| 7,133,905 B2 | 11/2006 | Dilley et al. |
| 7,136,922 B2 | 11/2006 | Sundaram et al. |
| 7,139,808 B2 | 11/2006 | Anderson et al. |
| 7,139,821 B1 | 11/2006 | Shah et al. |
| 7,143,169 B1 | 11/2006 | Champagne et al. |
| 7,143,170 B2 | 11/2006 | Swildens et al. |
| 7,146,560 B2 | 12/2006 | Dang et al. |
| 7,149,809 B2 | 12/2006 | Barde et al. |
| 7,152,118 B2 | 12/2006 | Anderson, IV et al. |
| 7,162,539 B2 | 1/2007 | Garcie-Luna-Aceves |
| 7,174,382 B2 | 2/2007 | Ramanathan et al. |
| 7,185,063 B1 | 2/2007 | Kasriel et al. |
| 7,185,084 B2 | 2/2007 | Sirivara et al. |

(56) References Cited

U.S. PATENT DOCUMENTS

| | | | |
|---|---|---|---|
| 7,188,214 B1 | 3/2007 | Kasriel et al. | |
| 7,194,522 B1 | 3/2007 | Swildens et al. | |
| 7,194,552 B1 | 3/2007 | Schneider | |
| 7,200,667 B2 | 4/2007 | Teodosiu et al. | |
| 7,216,170 B2 | 5/2007 | Danker et al. | |
| 7,225,254 B1 | 5/2007 | Swildens et al. | |
| 7,228,350 B2 | 6/2007 | Hong et al. | |
| 7,228,359 B1 | 6/2007 | Monteiro | |
| 7,233,978 B2 | 6/2007 | Overton et al. | |
| 7,240,100 B1* | 7/2007 | Wein | H04L 67/1008 709/214 |
| 7,249,196 B1 | 7/2007 | Peiffer et al. | |
| 7,251,675 B1 | 7/2007 | Kamakura et al. | |
| 7,254,626 B1 | 8/2007 | Kommula et al. | |
| 7,254,636 B1 | 8/2007 | O'Toole, Jr. et al. | |
| 7,257,581 B1 | 8/2007 | Steele et al. | |
| 7,260,598 B1 | 8/2007 | Liskov et al. | |
| 7,260,639 B2 | 8/2007 | Afergan et al. | |
| 7,269,784 B1 | 9/2007 | Kasriel et al. | |
| 7,274,658 B2 | 9/2007 | Bornstein et al. | |
| 7,284,056 B2 | 10/2007 | Ramig | |
| 7,289,519 B1 | 10/2007 | Liskov | |
| 7,293,093 B2 | 11/2007 | Leighton et al. | |
| 7,308,499 B2 | 12/2007 | Chavez | |
| 7,310,686 B2 | 12/2007 | Uysal | |
| 7,316,648 B2 | 1/2008 | Kelly et al. | |
| 7,318,074 B2 | 1/2008 | Iyengar et al. | |
| 7,320,131 B1 | 1/2008 | O'Toole, Jr. | |
| 7,321,918 B2 | 1/2008 | Burd et al. | |
| 7,339,937 B2 | 3/2008 | Mitra et al. | |
| 7,363,291 B1 | 4/2008 | Page | |
| 7,363,626 B2 | 4/2008 | Koutharapu et al. | |
| 7,370,089 B2 | 5/2008 | Boyd et al. | |
| 7,373,416 B2 | 5/2008 | Kagan et al. | |
| 7,376,736 B2 | 5/2008 | Sundaram et al. | |
| 7,380,078 B2 | 5/2008 | Ikegaya et al. | |
| 7,392,236 B2 | 6/2008 | Rusch et al. | |
| 7,398,301 B2 | 7/2008 | Hennessey et al. | |
| 7,406,512 B2 | 7/2008 | Swildens et al. | |
| 7,406,522 B2 | 7/2008 | Riddle | |
| 7,430,610 B2 | 9/2008 | Pace et al. | |
| 7,441,045 B2 | 10/2008 | Skene et al. | |
| 7,441,261 B2 | 10/2008 | Slater et al. | |
| 7,454,457 B1 | 11/2008 | Lowery et al. | |
| 7,454,500 B1 | 11/2008 | Hsu et al. | |
| 7,461,170 B1 | 12/2008 | Taylor et al. | |
| 7,464,142 B2 | 12/2008 | Flurry et al. | |
| 7,478,148 B2 | 1/2009 | Neerdaels | |
| 7,492,720 B2 | 2/2009 | Pruthi et al. | |
| 7,496,651 B1 | 2/2009 | Joshi | |
| 7,499,998 B2 | 3/2009 | Toebes et al. | |
| 7,502,836 B1 | 3/2009 | Menditto et al. | |
| 7,505,464 B2 | 3/2009 | Okmianski et al. | |
| 7,519,720 B2 | 4/2009 | Fishman et al. | |
| 7,519,726 B2 | 4/2009 | Palliyil et al. | |
| 7,523,181 B2 | 4/2009 | Swildens et al. | |
| 7,543,024 B2 | 6/2009 | Holstege | |
| 7,548,947 B2 | 6/2009 | Kasriel et al. | |
| 7,552,235 B2 | 6/2009 | Chase et al. | |
| 7,555,542 B1 | 6/2009 | Ayers et al. | |
| 7,561,571 B1 | 7/2009 | Lovett et al. | |
| 7,565,407 B1 | 7/2009 | Hayball | |
| 7,568,032 B2 | 7/2009 | Feng et al. | |
| 7,573,916 B1 | 8/2009 | Bechtolsheim et al. | |
| 7,574,499 B1 | 8/2009 | Swildens et al. | |
| 7,581,009 B1 | 8/2009 | Hsu et al. | |
| 7,594,189 B1 | 9/2009 | Walker et al. | |
| 7,596,619 B2 | 9/2009 | Leighton et al. | |
| 7,617,222 B2 | 11/2009 | Coulthard et al. | |
| 7,623,460 B2 | 11/2009 | Miyazaki | |
| 7,624,169 B2 | 11/2009 | Lisiecki et al. | |
| 7,631,101 B2 | 12/2009 | Sullivan et al. | |
| 7,640,296 B2 | 12/2009 | Fuchs et al. | |
| 7,650,376 B1 | 1/2010 | Blumenau | |
| 7,653,700 B1 | 1/2010 | Bahl et al. | |
| 7,653,725 B2 | 1/2010 | Yahiro et al. | |
| 7,657,613 B1 | 2/2010 | Hanson et al. | |
| 7,657,622 B1* | 2/2010 | Douglis | H04L 41/5003 709/224 |
| 7,661,027 B2 | 2/2010 | Langen et al. | |
| 7,664,831 B2 | 2/2010 | Cartmell et al. | |
| 7,664,879 B2 | 2/2010 | Chan et al. | |
| 7,676,570 B2 | 3/2010 | Levy et al. | |
| 7,680,897 B1 | 3/2010 | Carter et al. | |
| 7,685,251 B2 | 3/2010 | Houlihan et al. | |
| 7,693,813 B1 | 4/2010 | Cao et al. | |
| 7,702,724 B1* | 4/2010 | Brydon | H04L 67/02 709/203 |
| 7,706,740 B2 | 4/2010 | Collins et al. | |
| 7,707,314 B2 | 4/2010 | McCarthy et al. | |
| 7,711,647 B2 | 5/2010 | Gunaseelan et al. | |
| 7,711,788 B2 | 5/2010 | Lev Ran et al. | |
| 7,716,367 B1 | 5/2010 | Leighton et al. | |
| 7,725,602 B2 | 5/2010 | Liu et al. | |
| 7,730,187 B2 | 6/2010 | Raciborski et al. | |
| 7,739,400 B2 | 6/2010 | Lindbo et al. | |
| 7,747,720 B2 | 6/2010 | Toebes et al. | |
| 7,756,913 B1* | 7/2010 | Day | H04L 67/306 707/821 |
| 7,756,965 B2 | 7/2010 | Joshi | |
| 7,757,202 B2 | 7/2010 | Dahlsted et al. | |
| 7,761,572 B1 | 7/2010 | Auerbach | |
| 7,765,304 B2 | 7/2010 | Davis et al. | |
| 7,769,823 B2 | 8/2010 | Jenny et al. | |
| 7,773,596 B1 | 8/2010 | Marques | |
| 7,774,342 B1 | 8/2010 | Virdy | |
| 7,787,380 B1 | 8/2010 | Aggarwal et al. | |
| 7,792,989 B2 | 9/2010 | Toebes et al. | |
| 7,805,516 B2 | 9/2010 | Kettler et al. | |
| 7,809,597 B2 | 10/2010 | Das et al. | |
| 7,813,308 B2 | 10/2010 | Reddy et al. | |
| 7,814,229 B1 | 10/2010 | Cabrera et al. | |
| 7,818,454 B2 | 10/2010 | Kim et al. | |
| 7,827,256 B2 | 11/2010 | Phillips et al. | |
| 7,836,177 B2 | 11/2010 | Kasriel et al. | |
| 7,873,065 B1 | 1/2011 | Mukerji et al. | |
| 7,890,612 B2 | 2/2011 | Todd et al. | |
| 7,899,899 B2 | 3/2011 | Joshi | |
| 7,904,875 B2 | 3/2011 | Hegyi | |
| 7,912,921 B2 | 3/2011 | O'Rourke et al. | |
| 7,925,782 B2 | 4/2011 | Sivasubramanian et al. | |
| 7,930,393 B1 | 4/2011 | Baumback et al. | |
| 7,930,402 B2 | 4/2011 | Swildens et al. | |
| 7,930,427 B2 | 4/2011 | Josefsberg et al. | |
| 7,933,988 B2 | 4/2011 | Nasuto et al. | |
| 7,937,477 B1 | 5/2011 | Day et al. | |
| 7,945,693 B2 | 5/2011 | Farber et al. | |
| 7,949,779 B2 | 5/2011 | Farber et al. | |
| 7,958,222 B1 | 6/2011 | Pruitt et al. | |
| 7,958,258 B2 | 6/2011 | Yeung et al. | |
| 7,962,597 B2 | 6/2011 | Richardson et al. | |
| 7,966,404 B2 | 6/2011 | Hedin et al. | |
| 7,970,816 B2 | 6/2011 | Chess et al. | |
| 7,970,940 B1 | 6/2011 | van de Ven et al. | |
| 7,979,509 B1 | 7/2011 | Malmskog et al. | |
| 7,991,910 B2 | 8/2011 | Richardson et al. | |
| 7,996,533 B2 | 8/2011 | Leighton et al. | |
| 7,996,535 B2 | 8/2011 | Auerbach | |
| 8,000,724 B1 | 8/2011 | Rayburn et al. | |
| 8,010,707 B2 | 8/2011 | Elzur et al. | |
| 8,019,869 B2 | 9/2011 | Kriegsman | |
| 8,024,441 B2 | 9/2011 | Kommula et al. | |
| 8,028,090 B2 | 9/2011 | Richardson et al. | |
| 8,041,773 B2 | 10/2011 | Abu-Ghazaleh et al. | |
| 8,041,809 B2 | 10/2011 | Sundaram et al. | |
| 8,041,818 B2 | 10/2011 | Gupta et al. | |
| 8,042,054 B2 | 10/2011 | White et al. | |
| 8,065,275 B2 | 11/2011 | Eriksen et al. | |
| 8,069,231 B2 | 11/2011 | Schran et al. | |
| 8,073,940 B1 | 12/2011 | Richardson et al. | |
| 8,082,348 B1 | 12/2011 | Averbuj et al. | |
| 8,108,623 B2 | 1/2012 | Krishnaprasad et al. | |
| 8,117,306 B1* | 2/2012 | Baumback | H04L 43/0811 709/217 |

(56) References Cited

U.S. PATENT DOCUMENTS

| | | |
|---|---|---|
| 8,122,098 B1 | 2/2012 | Richardson et al. |
| 8,122,124 B1 | 2/2012 | Baumback et al. |
| 8,132,242 B1 | 3/2012 | Wu |
| 8,135,820 B2 | 3/2012 | Richardson et al. |
| 8,156,199 B1 | 4/2012 | Hoche-Mong et al. |
| 8,156,243 B2 | 4/2012 | Richardson et al. |
| 8,175,863 B1 | 5/2012 | Ostermeyer et al. |
| 8,190,682 B2 | 5/2012 | Paterson-Jones et al. |
| 8,195,837 B2 | 6/2012 | McCarthy et al. |
| 8,224,971 B1 | 7/2012 | Miller et al. |
| 8,224,986 B1 | 7/2012 | Liskov et al. |
| 8,224,994 B1 | 7/2012 | Schneider |
| 8,234,403 B2 | 7/2012 | Richardson et al. |
| 8,239,530 B2 | 8/2012 | Sundaram et al. |
| 8,250,135 B2 | 8/2012 | Driesen et al. |
| 8,250,211 B2 | 8/2012 | Swildens et al. |
| 8,250,219 B2 | 8/2012 | Raciborski et al. |
| 8,266,288 B2 | 9/2012 | Banerjee et al. |
| 8,266,327 B2 | 9/2012 | Kumar et al. |
| 8,280,998 B2 | 10/2012 | Joshi |
| 8,281,035 B2 | 10/2012 | Farber et al. |
| 8,291,046 B2 | 10/2012 | Farber et al. |
| 8,291,117 B1 | 10/2012 | Eggleston et al. |
| 8,301,645 B1 | 10/2012 | Crook |
| 8,321,568 B2 | 11/2012 | Sivasubramanian et al. |
| 8,380,831 B2 | 2/2013 | Barber |
| 8,402,137 B2 | 3/2013 | Sivasubramanian et al. |
| 8,433,749 B2 | 4/2013 | Wee et al. |
| 8,447,876 B2 | 5/2013 | Verma et al. |
| 8,452,874 B2 | 5/2013 | MacCarthaigh et al. |
| 8,463,877 B1 | 6/2013 | Richardson |
| 8,468,222 B2 | 6/2013 | Sakata et al. |
| 8,468,245 B2 | 6/2013 | Farber et al. |
| 8,473,613 B2 | 6/2013 | Farber et al. |
| 8,478,903 B2 | 7/2013 | Farber et al. |
| 8,504,721 B2 | 8/2013 | Hsu et al. |
| 8,510,428 B2 | 8/2013 | Joshi |
| 8,510,807 B1 | 8/2013 | Elazary et al. |
| 8,521,851 B1 | 8/2013 | Richardson et al. |
| 8,521,908 B2 | 8/2013 | Holmes et al. |
| 8,526,405 B2 | 9/2013 | Curtis et al. |
| 8,527,658 B2 | 9/2013 | Holmes et al. |
| 8,572,208 B2 | 10/2013 | Farber et al. |
| 8,572,210 B2 | 10/2013 | Farber et al. |
| 8,577,992 B1 | 11/2013 | Richardson et al. |
| 8,589,996 B2 | 11/2013 | Ma et al. |
| 8,606,996 B2 | 12/2013 | Richardson et al. |
| 8,612,565 B2 | 12/2013 | Schneider |
| 8,615,549 B2 | 12/2013 | Knowles et al. |
| 8,626,950 B1 | 1/2014 | Richardson et al. |
| 8,635,340 B1 | 1/2014 | Schneider |
| 8,639,817 B2 | 1/2014 | Sivasubramanian et al. |
| 8,645,539 B2 | 2/2014 | McCarthy et al. |
| 8,676,918 B2 | 3/2014 | Richardson et al. |
| 8,683,076 B2 | 3/2014 | Farber et al. |
| 8,688,837 B1 | 4/2014 | Richardson et al. |
| 8,712,950 B2 | 4/2014 | Smith et al. |
| 8,732,309 B1 | 5/2014 | Richardson et al. |
| 8,756,322 B1 | 6/2014 | Lynch |
| 8,756,325 B2 | 6/2014 | Sivasubramanian et al. |
| 8,756,341 B1 | 6/2014 | Richardson et al. |
| 8,782,236 B1 | 7/2014 | Marshall et al. |
| 8,782,279 B2 | 7/2014 | Eggleston et al. |
| 8,819,283 B2 | 8/2014 | Richardson et al. |
| 8,914,514 B1 | 12/2014 | Jenkins et al. |
| 8,924,528 B1 | 12/2014 | Richardson et al. |
| 8,930,513 B1 | 1/2015 | Richardson et al. |
| 8,930,544 B2 | 1/2015 | Richardson et al. |
| 8,938,526 B1 | 1/2015 | Richardson et al. |
| 8,966,318 B1 | 2/2015 | Shah |
| 9,003,035 B1 | 4/2015 | Richardson et al. |
| 9,003,040 B2 | 4/2015 | MacCarthaigh et al. |
| 9,009,286 B2 | 4/2015 | Sivasubramanian et al. |
| 9,009,334 B1 | 4/2015 | Jenkins et al. |
| 9,021,127 B2 | 4/2015 | Richardson et al. |
| 9,021,128 B2 | 4/2015 | Sivasubramanian et al. |
| 9,021,129 B2 | 4/2015 | Richardson et al. |
| 9,026,616 B2 | 5/2015 | Sivasubramanian et al. |
| 9,037,975 B1 | 5/2015 | Taylor et al. |
| 9,075,893 B1 | 7/2015 | Jenkins |
| 9,083,675 B2 | 7/2015 | Richardson et al. |
| 9,083,743 B1 | 7/2015 | Patel et al. |
| 9,106,701 B2 | 8/2015 | Richardson et al. |
| 9,130,756 B2 | 9/2015 | Richardson et al. |
| 9,154,551 B1 | 10/2015 | Watson |
| 9,160,703 B2 | 10/2015 | Richardson et al. |
| 9,172,674 B1 | 10/2015 | Patel et al. |
| 9,176,894 B2 | 11/2015 | Marshall et al. |
| 9,185,012 B2 | 11/2015 | Richardson et al. |
| 9,191,338 B2 | 11/2015 | Richardson et al. |
| 9,191,458 B2 | 11/2015 | Richardson et al. |
| 9,195,996 B1 | 11/2015 | Walsh et al. |
| 9,208,097 B2 | 12/2015 | Richardson et al. |
| 9,210,235 B2 | 12/2015 | Sivasubramanian et al. |
| 9,237,114 B2 | 1/2016 | Richardson et al. |
| 9,240,954 B1 | 1/2016 | Ellsworth et al. |
| 9,246,776 B2 | 1/2016 | Ellsworth et al. |
| 9,251,112 B2 | 2/2016 | Richardson et al. |
| 9,253,065 B2 | 2/2016 | Richardson et al. |
| 9,294,391 B1 | 3/2016 | Mostert |
| 2001/0000811 A1 | 5/2001 | May et al. |
| 2001/0025305 A1 | 9/2001 | Yoshiasa et al. |
| 2001/0032133 A1 | 10/2001 | Moran |
| 2001/0034704 A1* | 10/2001 | Farhat ............... G06Q 20/02 705/39 |
| 2001/0049741 A1 | 12/2001 | Skene et al. |
| 2001/0052016 A1 | 12/2001 | Skene et al. |
| 2001/0056416 A1 | 12/2001 | Garcia-Luna-Aceves |
| 2001/0056500 A1 | 12/2001 | Farber et al. |
| 2002/0002613 A1 | 1/2002 | Freeman et al. |
| 2002/0004846 A1 | 1/2002 | Garcia-Luna-Aceves et al. |
| 2002/0007413 A1 | 1/2002 | Garcia-Luna-Aceves et al. |
| 2002/0010798 A1 | 1/2002 | Ben-Shaul et al. |
| 2002/0048269 A1 | 4/2002 | Hong et al. |
| 2002/0049608 A1 | 4/2002 | Hartsell et al. |
| 2002/0049857 A1 | 4/2002 | Farber et al. |
| 2002/0052942 A1* | 5/2002 | Swildens ............ G06F 9/505 709/223 |
| 2002/0062372 A1 | 5/2002 | Hong et al. |
| 2002/0068554 A1 | 6/2002 | Dusse |
| 2002/0069420 A1 | 6/2002 | Russell et al. |
| 2002/0078233 A1* | 6/2002 | Biliris ............... H04L 29/06 709/238 |
| 2002/0082858 A1 | 6/2002 | Heddaya et al. |
| 2002/0083118 A1 | 6/2002 | Sim |
| 2002/0083148 A1 | 6/2002 | Shaw et al. |
| 2002/0087374 A1* | 7/2002 | Boubez ............... G06Q 30/02 705/500 |
| 2002/0091786 A1 | 7/2002 | Yamaguchi et al. |
| 2002/0092026 A1 | 7/2002 | Janniello et al. |
| 2002/0099616 A1 | 7/2002 | Sweldens |
| 2002/0099850 A1 | 7/2002 | Farber et al. |
| 2002/0101836 A1 | 8/2002 | Dorenbosch |
| 2002/0103820 A1 | 8/2002 | Cartmell et al. |
| 2002/0103972 A1 | 8/2002 | Satran et al. |
| 2002/0107944 A1 | 8/2002 | Bai et al. |
| 2002/0112049 A1 | 8/2002 | Elnozahy et al. |
| 2002/0116481 A1 | 8/2002 | Lee |
| 2002/0116491 A1 | 8/2002 | Boyd et al. |
| 2002/0116582 A1 | 8/2002 | Copeland et al. |
| 2002/0120782 A1 | 8/2002 | Dillon et al. |
| 2002/0124047 A1 | 9/2002 | Gartner et al. |
| 2002/0124098 A1 | 9/2002 | Shaw |
| 2002/0129123 A1 | 9/2002 | Johnson et al. |
| 2002/0131428 A1 | 9/2002 | Pecus et al. |
| 2002/0135611 A1 | 9/2002 | Deosaran et al. |
| 2002/0138286 A1 | 9/2002 | Engstrom |
| 2002/0138437 A1 | 9/2002 | Lewin et al. |
| 2002/0143989 A1 | 10/2002 | Huitema et al. |
| 2002/0145993 A1 | 10/2002 | Chowdhury et al. |
| 2002/0147770 A1 | 10/2002 | Tang |
| 2002/0147774 A1 | 10/2002 | Lisiecki et al. |
| 2002/0150094 A1 | 10/2002 | Cheng et al. |
| 2002/0156911 A1 | 10/2002 | Croman et al. |

(56) References Cited

U.S. PATENT DOCUMENTS

| | | |
|---|---|---|
| 2002/0161745 A1 | 10/2002 | Call |
| 2002/0161767 A1 | 10/2002 | Shapiro et al. |
| 2002/0163882 A1 | 11/2002 | Bornstein et al. |
| 2002/0165912 A1 | 11/2002 | Wenocur et al. |
| 2002/0169890 A1 | 11/2002 | Beaumont et al. |
| 2002/0184368 A1 | 12/2002 | Wang |
| 2002/0188722 A1 | 12/2002 | Banerjee et al. |
| 2002/0194324 A1 | 12/2002 | Guha |
| 2002/0198953 A1 | 12/2002 | O'Rourke et al. |
| 2003/0002484 A1 | 1/2003 | Freedman |
| 2003/0007482 A1 | 1/2003 | Khello et al. |
| 2003/0009591 A1 | 1/2003 | Hayball et al. |
| 2003/0026410 A1 | 2/2003 | Lumsden |
| 2003/0028642 A1 | 2/2003 | Agarwal et al. |
| 2003/0033283 A1 | 2/2003 | Evans et al. |
| 2003/0037139 A1* | 2/2003 | Shteyn ............... G06Q 30/02 709/225 |
| 2003/0041094 A1 | 2/2003 | Lara et al. |
| 2003/0065739 A1 | 4/2003 | Shnier |
| 2003/0074401 A1* | 4/2003 | Connell ............... G06Q 30/02 709/203 |
| 2003/0074472 A1 | 4/2003 | Lucco et al. |
| 2003/0079027 A1 | 4/2003 | Slocombe et al. |
| 2003/0093523 A1 | 5/2003 | Cranor et al. |
| 2003/0099202 A1 | 5/2003 | Lear et al. |
| 2003/0099237 A1 | 5/2003 | Mitra et al. |
| 2003/0101278 A1 | 5/2003 | Garcia-Luna-Aceves et al. |
| 2003/0112792 A1 | 6/2003 | Cranor et al. |
| 2003/0120741 A1 | 6/2003 | Wu et al. |
| 2003/0133554 A1* | 7/2003 | Nykanen ............... H04L 29/06 379/201.01 |
| 2003/0135509 A1 | 7/2003 | Davis et al. |
| 2003/0140087 A1 | 7/2003 | Lincoln et al. |
| 2003/0145038 A1 | 7/2003 | Tariq et al. |
| 2003/0145066 A1 | 7/2003 | Okada et al. |
| 2003/0149581 A1* | 8/2003 | Chaudhri ........... G06Q 30/0601 709/203 |
| 2003/0154239 A1 | 8/2003 | Davis et al. |
| 2003/0154284 A1 | 8/2003 | Bernardin et al. |
| 2003/0163722 A1 | 8/2003 | Anderson, IV |
| 2003/0172145 A1 | 9/2003 | Nguyen |
| 2003/0172183 A1 | 9/2003 | Anderson, IV et al. |
| 2003/0172291 A1 | 9/2003 | Judge et al. |
| 2003/0174648 A1 | 9/2003 | Wang et al. |
| 2003/0182305 A1 | 9/2003 | Balva et al. |
| 2003/0182413 A1 | 9/2003 | Allen et al. |
| 2003/0182447 A1 | 9/2003 | Schilling |
| 2003/0187935 A1 | 10/2003 | Agarwalla et al. |
| 2003/0187970 A1* | 10/2003 | Chase ............... G06Q 10/06 709/223 |
| 2003/0191822 A1 | 10/2003 | Leighton et al. |
| 2003/0200394 A1 | 10/2003 | Ashmore et al. |
| 2003/0204602 A1 | 10/2003 | Hudson et al. |
| 2003/0229682 A1 | 12/2003 | Day |
| 2003/0233423 A1 | 12/2003 | Dilley et al. |
| 2003/0233445 A1 | 12/2003 | Levy et al. |
| 2003/0233455 A1 | 12/2003 | Leber et al. |
| 2003/0236700 A1* | 12/2003 | Arning ............... G06Q 30/0282 705/347 |
| 2004/0003032 A1* | 1/2004 | Ma ............... G06F 17/3089 709/203 |
| 2004/0010563 A1 | 1/2004 | Forte et al. |
| 2004/0010588 A1 | 1/2004 | Slater et al. |
| 2004/0010621 A1 | 1/2004 | Afergan et al. |
| 2004/0015584 A1 | 1/2004 | Cartmell et al. |
| 2004/0019518 A1 | 1/2004 | Abraham et al. |
| 2004/0024841 A1 | 2/2004 | Becker et al. |
| 2004/0030620 A1 | 2/2004 | Benjamin et al. |
| 2004/0034744 A1 | 2/2004 | Karlsson et al. |
| 2004/0039798 A1 | 2/2004 | Hotz et al. |
| 2004/0044731 A1 | 3/2004 | Chen et al. |
| 2004/0044791 A1 | 3/2004 | Pouzzner |
| 2004/0059805 A1 | 3/2004 | Dinker et al. |
| 2004/0064335 A1 | 4/2004 | Yang |
| 2004/0064501 A1 | 4/2004 | Jan et al. |
| 2004/0073596 A1 | 4/2004 | Kloninger et al. |
| 2004/0073707 A1 | 4/2004 | Dillon |
| 2004/0073867 A1 | 4/2004 | Kausik et al. |
| 2004/0078468 A1 | 4/2004 | Hedin et al. |
| 2004/0078487 A1 | 4/2004 | Cernohous et al. |
| 2004/0083283 A1 | 4/2004 | Sundaram et al. |
| 2004/0083307 A1 | 4/2004 | Uysal |
| 2004/0117455 A1 | 6/2004 | Kaminsky et al. |
| 2004/0128344 A1 | 7/2004 | Trossen |
| 2004/0128346 A1 | 7/2004 | Melamed et al. |
| 2004/0167981 A1 | 8/2004 | Douglas et al. |
| 2004/0167982 A1 | 8/2004 | Cohen et al. |
| 2004/0172466 A1 | 9/2004 | Douglas et al. |
| 2004/0194085 A1 | 9/2004 | Beaubien et al. |
| 2004/0194102 A1 | 9/2004 | Neerdaels |
| 2004/0203630 A1 | 10/2004 | Wang |
| 2004/0205149 A1 | 10/2004 | Dillon et al. |
| 2004/0205162 A1 | 10/2004 | Parikh |
| 2004/0215823 A1 | 10/2004 | Kleinfelter et al. |
| 2004/0221019 A1 | 11/2004 | Swildens et al. |
| 2004/0221034 A1 | 11/2004 | Kausik et al. |
| 2004/0249939 A1 | 12/2004 | Amini et al. |
| 2004/0249971 A1 | 12/2004 | Klinker |
| 2004/0249975 A1 | 12/2004 | Tuck et al. |
| 2004/0254921 A1 | 12/2004 | Cohen et al. |
| 2004/0267906 A1 | 12/2004 | Truty |
| 2004/0267907 A1 | 12/2004 | Gustafsson |
| 2005/0010653 A1* | 1/2005 | McCanne ............. H04L 69/329 709/219 |
| 2005/0021706 A1 | 1/2005 | Maggi et al. |
| 2005/0021862 A1 | 1/2005 | Schroeder et al. |
| 2005/0027882 A1 | 2/2005 | Sullivan et al. |
| 2005/0038967 A1 | 2/2005 | Umbehocker et al. |
| 2005/0044270 A1 | 2/2005 | Grove et al. |
| 2005/0102683 A1 | 5/2005 | Branson et al. |
| 2005/0108169 A1* | 5/2005 | Balasubramanian .. G06Q 30/02 705/50 |
| 2005/0108262 A1 | 5/2005 | Fawcett |
| 2005/0108529 A1 | 5/2005 | Juneau |
| 2005/0114296 A1 | 5/2005 | Farber et al. |
| 2005/0117717 A1 | 6/2005 | Lumsden |
| 2005/0132083 A1 | 6/2005 | Raciborski et al. |
| 2005/0147088 A1 | 7/2005 | Bao et al. |
| 2005/0157712 A1 | 7/2005 | Rangarajan et al. |
| 2005/0160133 A1 | 7/2005 | Greenlee et al. |
| 2005/0163168 A1 | 7/2005 | Sheth et al. |
| 2005/0168782 A1 | 8/2005 | Kobashi et al. |
| 2005/0171959 A1 | 8/2005 | Deforche et al. |
| 2005/0188073 A1 | 8/2005 | Nakamichi et al. |
| 2005/0192008 A1* | 9/2005 | Desai ............... G06F 21/335 455/435.2 |
| 2005/0198334 A1 | 9/2005 | Farber et al. |
| 2005/0198571 A1 | 9/2005 | Kramer et al. |
| 2005/0216569 A1 | 9/2005 | Coppola et al. |
| 2005/0216674 A1 | 9/2005 | Robbin et al. |
| 2005/0229119 A1 | 10/2005 | Torvinen |
| 2005/0232165 A1 | 10/2005 | Brawn et al. |
| 2005/0259645 A1 | 11/2005 | Chen et al. |
| 2005/0259672 A1 | 11/2005 | Eduri |
| 2005/0262248 A1 | 11/2005 | Jennings, III et al. |
| 2005/0267991 A1 | 12/2005 | Huitema et al. |
| 2005/0267992 A1 | 12/2005 | Huitema et al. |
| 2005/0267993 A1 | 12/2005 | Huitema et al. |
| 2005/0278259 A1 | 12/2005 | Gunaseelan et al. |
| 2005/0283759 A1 | 12/2005 | Peteanu et al. |
| 2005/0283784 A1 | 12/2005 | Suzuki |
| 2006/0013158 A1 | 1/2006 | Ahuja et al. |
| 2006/0020596 A1 | 1/2006 | Liu et al. |
| 2006/0020684 A1 | 1/2006 | Mukherjee et al. |
| 2006/0020714 A1 | 1/2006 | Girouard et al. |
| 2006/0020715 A1 | 1/2006 | Jungck |
| 2006/0026067 A1 | 2/2006 | Nicholas et al. |
| 2006/0026154 A1 | 2/2006 | Altinel et al. |
| 2006/0036720 A1 | 2/2006 | Faulk, Jr. |
| 2006/0036966 A1 | 2/2006 | Yevdayev |
| 2006/0037037 A1 | 2/2006 | Miranz |
| 2006/0039352 A1 | 2/2006 | Karstens |
| 2006/0041614 A1 | 2/2006 | Oe |
| 2006/0047787 A1 | 3/2006 | Agarwal et al. |

(56) References Cited

U.S. PATENT DOCUMENTS

| | | | |
|---|---|---|---|
| 2006/0047813 A1 | 3/2006 | Aggarwal et al. | |
| 2006/0059246 A1 | 3/2006 | Grove | |
| 2006/0063534 A1 | 3/2006 | Kokkonen et al. | |
| 2006/0064476 A1 | 3/2006 | Decasper et al. | |
| 2006/0064500 A1 | 3/2006 | Roth et al. | |
| 2006/0074750 A1 | 4/2006 | Clark et al. | |
| 2006/0075084 A1 | 4/2006 | Lyon | |
| 2006/0075139 A1 | 4/2006 | Jungck | |
| 2006/0083165 A1* | 4/2006 | McLane | H04L 12/2697 370/229 |
| 2006/0085536 A1 | 4/2006 | Meyer et al. | |
| 2006/0088026 A1 | 4/2006 | Mazur et al. | |
| 2006/0112066 A1 | 5/2006 | Hamzy | |
| 2006/0112176 A1 | 5/2006 | Liu et al. | |
| 2006/0120385 A1 | 6/2006 | Atchison et al. | |
| 2006/0129665 A1 | 6/2006 | Toebes et al. | |
| 2006/0136453 A1 | 6/2006 | Kwan | |
| 2006/0143293 A1 | 6/2006 | Freedman | |
| 2006/0149529 A1 | 7/2006 | Nguyen et al. | |
| 2006/0155823 A1 | 7/2006 | Tran et al. | |
| 2006/0155862 A1 | 7/2006 | Kathi et al. | |
| 2006/0161541 A1 | 7/2006 | Cencini | |
| 2006/0165051 A1 | 7/2006 | Banerjee et al. | |
| 2006/0168088 A1 | 7/2006 | Leighton et al. | |
| 2006/0173957 A1 | 8/2006 | Robinson | |
| 2006/0179080 A1 | 8/2006 | Meek et al. | |
| 2006/0184936 A1 | 8/2006 | Abels et al. | |
| 2006/0190605 A1* | 8/2006 | Franz | G06Q 10/0631 709/226 |
| 2006/0193247 A1 | 8/2006 | Naseh et al. | |
| 2006/0195866 A1 | 8/2006 | Thukral | |
| 2006/0206568 A1 | 9/2006 | Verma et al. | |
| 2006/0206586 A1 | 9/2006 | Ling et al. | |
| 2006/0218265 A1 | 9/2006 | Farber et al. | |
| 2006/0218304 A1 | 9/2006 | Mukherjee et al. | |
| 2006/0227740 A1 | 10/2006 | McLaughlin et al. | |
| 2006/0227758 A1 | 10/2006 | Rana et al. | |
| 2006/0230137 A1 | 10/2006 | Gare et al. | |
| 2006/0233155 A1 | 10/2006 | Srivastava | |
| 2006/0253546 A1 | 11/2006 | Chang et al. | |
| 2006/0253609 A1 | 11/2006 | Andreev et al. | |
| 2006/0259581 A1 | 11/2006 | Piersol | |
| 2006/0259690 A1 | 11/2006 | Vittal et al. | |
| 2006/0259984 A1 | 11/2006 | Juneau | |
| 2006/0265497 A1 | 11/2006 | Ohata et al. | |
| 2006/0265508 A1 | 11/2006 | Angel et al. | |
| 2006/0265516 A1 | 11/2006 | Schilling | |
| 2006/0265720 A1* | 11/2006 | Cai | H04L 67/16 719/330 |
| 2006/0271641 A1 | 11/2006 | Stavrakos et al. | |
| 2006/0282522 A1 | 12/2006 | Lewin et al. | |
| 2006/0288119 A1 | 12/2006 | Kim et al. | |
| 2007/0005689 A1 | 1/2007 | Leighton et al. | |
| 2007/0005801 A1 | 1/2007 | Kumar et al. | |
| 2007/0005892 A1 | 1/2007 | Mullender et al. | |
| 2007/0011267 A1 | 1/2007 | Overton et al. | |
| 2007/0014241 A1 | 1/2007 | Banerjee et al. | |
| 2007/0021998 A1 | 1/2007 | Laithwaite et al. | |
| 2007/0028001 A1 | 2/2007 | Phillips et al. | |
| 2007/0038729 A1 | 2/2007 | Sullivan et al. | |
| 2007/0038994 A1 | 2/2007 | Davis et al. | |
| 2007/0041393 A1 | 2/2007 | Westhead et al. | |
| 2007/0043859 A1 | 2/2007 | Ruul | |
| 2007/0050522 A1 | 3/2007 | Grove et al. | |
| 2007/0050703 A1 | 3/2007 | Lebel | |
| 2007/0055764 A1 | 3/2007 | Dilley et al. | |
| 2007/0061440 A1* | 3/2007 | Sundaram | H04L 29/12132 709/223 |
| 2007/0076872 A1 | 4/2007 | Juneau | |
| 2007/0086429 A1 | 4/2007 | Lawrence et al. | |
| 2007/0094361 A1 | 4/2007 | Hoynowski et al. | |
| 2007/0101377 A1 | 5/2007 | Six et al. | |
| 2007/0118667 A1 | 5/2007 | McCarthy et al. | |
| 2007/0118668 A1 | 5/2007 | McCarthy et al. | |
| 2007/0134641 A1 | 6/2007 | Lieu | |
| 2007/0156919 A1 | 7/2007 | Potti et al. | |
| 2007/0162331 A1 | 7/2007 | Sullivan | |
| 2007/0168517 A1* | 7/2007 | Weller | G06Q 40/04 709/226 |
| 2007/0174426 A1* | 7/2007 | Swildens | H04L 12/14 709/217 |
| 2007/0174442 A1 | 7/2007 | Sherman et al. | |
| 2007/0174490 A1 | 7/2007 | Choi et al. | |
| 2007/0183342 A1 | 8/2007 | Wong et al. | |
| 2007/0198982 A1 | 8/2007 | Bolan et al. | |
| 2007/0204107 A1 | 8/2007 | Greenfield et al. | |
| 2007/0208737 A1 | 9/2007 | Li et al. | |
| 2007/0219795 A1 | 9/2007 | Park et al. | |
| 2007/0220010 A1 | 9/2007 | Ertugrul | |
| 2007/0233705 A1 | 10/2007 | Farber et al. | |
| 2007/0233706 A1 | 10/2007 | Farber et al. | |
| 2007/0233846 A1 | 10/2007 | Farber et al. | |
| 2007/0233884 A1 | 10/2007 | Farber et al. | |
| 2007/0244964 A1 | 10/2007 | Challenger et al. | |
| 2007/0250467 A1 | 10/2007 | Mesnik et al. | |
| 2007/0250560 A1 | 10/2007 | Wein et al. | |
| 2007/0250601 A1 | 10/2007 | Amlekar et al. | |
| 2007/0250611 A1 | 10/2007 | Bhogal et al. | |
| 2007/0253377 A1 | 11/2007 | Janneteau et al. | |
| 2007/0255843 A1 | 11/2007 | Zubev | |
| 2007/0263604 A1 | 11/2007 | Tai | |
| 2007/0266113 A1 | 11/2007 | Koopmans et al. | |
| 2007/0266311 A1 | 11/2007 | Westphal | |
| 2007/0266333 A1 | 11/2007 | Cossey et al. | |
| 2007/0270165 A1 | 11/2007 | Poosala | |
| 2007/0271375 A1 | 11/2007 | Hwang | |
| 2007/0271385 A1 | 11/2007 | Davis et al. | |
| 2007/0271560 A1 | 11/2007 | Wahlert et al. | |
| 2007/0280229 A1 | 12/2007 | Kenney | |
| 2007/0288588 A1 | 12/2007 | Wein et al. | |
| 2007/0291739 A1 | 12/2007 | Sullivan et al. | |
| 2008/0005057 A1 | 1/2008 | Ozzie et al. | |
| 2008/0008089 A1 | 1/2008 | Bornstein et al. | |
| 2008/0016233 A1 | 1/2008 | Schneider | |
| 2008/0025304 A1 | 1/2008 | Venkataswami et al. | |
| 2008/0037536 A1 | 2/2008 | Padmanabhan et al. | |
| 2008/0046550 A1 | 2/2008 | Mazur et al. | |
| 2008/0046596 A1 | 2/2008 | Afergan et al. | |
| 2008/0065724 A1 | 3/2008 | Seed et al. | |
| 2008/0065745 A1 | 3/2008 | Leighton et al. | |
| 2008/0071859 A1 | 3/2008 | Seed et al. | |
| 2008/0071987 A1 | 3/2008 | Karn et al. | |
| 2008/0072264 A1 | 3/2008 | Crayford | |
| 2008/0082551 A1 | 4/2008 | Farber et al. | |
| 2008/0082662 A1 | 4/2008 | Dandliker et al. | |
| 2008/0086574 A1 | 4/2008 | Raciborski et al. | |
| 2008/0092242 A1 | 4/2008 | Rowley | |
| 2008/0103805 A1 | 5/2008 | Shear et al. | |
| 2008/0104268 A1 | 5/2008 | Farber et al. | |
| 2008/0114829 A1 | 5/2008 | Button et al. | |
| 2008/0125077 A1 | 5/2008 | Velazquez et al. | |
| 2008/0126706 A1 | 5/2008 | Newport et al. | |
| 2008/0134043 A1 | 6/2008 | Georgis et al. | |
| 2008/0140800 A1 | 6/2008 | Farber et al. | |
| 2008/0147866 A1 | 6/2008 | Stolorz et al. | |
| 2008/0147873 A1 | 6/2008 | Matsumoto | |
| 2008/0155059 A1 | 6/2008 | Hardin et al. | |
| 2008/0155061 A1 | 6/2008 | Afergan et al. | |
| 2008/0155613 A1 | 6/2008 | Benya et al. | |
| 2008/0155614 A1 | 6/2008 | Cooper et al. | |
| 2008/0162667 A1 | 7/2008 | Verma et al. | |
| 2008/0162821 A1 | 7/2008 | Duran et al. | |
| 2008/0162843 A1 | 7/2008 | Davis et al. | |
| 2008/0172488 A1 | 7/2008 | Jawahar et al. | |
| 2008/0189437 A1 | 8/2008 | Halley | |
| 2008/0201332 A1 | 8/2008 | Souders et al. | |
| 2008/0215718 A1 | 9/2008 | Stolorz et al. | |
| 2008/0215730 A1 | 9/2008 | Sundaram et al. | |
| 2008/0215735 A1 | 9/2008 | Farber et al. | |
| 2008/0215747 A1 | 9/2008 | Menon et al. | |
| 2008/0215750 A1 | 9/2008 | Farber et al. | |
| 2008/0215755 A1 | 9/2008 | Farber et al. | |
| 2008/0222281 A1 | 9/2008 | Dilley et al. | |
| 2008/0222291 A1 | 9/2008 | Weller et al. | |

(56) References Cited

U.S. PATENT DOCUMENTS

| | | |
|---|---|---|
| 2008/0222295 A1 | 9/2008 | Robinson et al. |
| 2008/0228574 A1 | 9/2008 | Stewart et al. |
| 2008/0228920 A1 | 9/2008 | Souders et al. |
| 2008/0235400 A1 | 9/2008 | Slocombe et al. |
| 2008/0256175 A1 | 10/2008 | Lee et al. |
| 2008/0275772 A1* | 11/2008 | Suryanarayana ...... G06Q 30/00 705/14.66 |
| 2008/0281946 A1 | 11/2008 | Swildens et al. |
| 2008/0281950 A1 | 11/2008 | Wald et al. |
| 2008/0288722 A1 | 11/2008 | Lecoq et al. |
| 2008/0301670 A1 | 12/2008 | Gouge et al. |
| 2008/0312766 A1 | 12/2008 | Couckuyt |
| 2008/0319862 A1 | 12/2008 | Golan et al. |
| 2008/0320123 A1 | 12/2008 | Houlihan et al. |
| 2008/0320269 A1 | 12/2008 | Houlihan et al. |
| 2009/0013063 A1 | 1/2009 | Soman |
| 2009/0016236 A1 | 1/2009 | Alcala et al. |
| 2009/0029644 A1 | 1/2009 | Sue et al. |
| 2009/0031367 A1 | 1/2009 | Sue |
| 2009/0031368 A1 | 1/2009 | Ling |
| 2009/0031376 A1 | 1/2009 | Riley et al. |
| 2009/0049098 A1 | 2/2009 | Pickelsimer et al. |
| 2009/0063038 A1 | 3/2009 | Shrivathsan et al. |
| 2009/0063704 A1 | 3/2009 | Taylor et al. |
| 2009/0070533 A1 | 3/2009 | Elazary et al. |
| 2009/0083228 A1 | 3/2009 | Shatz et al. |
| 2009/0086741 A1* | 4/2009 | Zhang ................. H04L 41/5009 370/401 |
| 2009/0089869 A1 | 4/2009 | Varghese |
| 2009/0103707 A1 | 4/2009 | McGary et al. |
| 2009/0106381 A1 | 4/2009 | Kasriel et al. |
| 2009/0112703 A1 | 4/2009 | Brown |
| 2009/0125393 A1 | 5/2009 | Hwang et al. |
| 2009/0125934 A1 | 5/2009 | Jones et al. |
| 2009/0132368 A1 | 5/2009 | Cotter et al. |
| 2009/0132648 A1 | 5/2009 | Swildens et al. |
| 2009/0144412 A1 | 6/2009 | Ferguson et al. |
| 2009/0150926 A1 | 6/2009 | Schlack |
| 2009/0157850 A1 | 6/2009 | Gagliardi et al. |
| 2009/0158163 A1 | 6/2009 | Stephens et al. |
| 2009/0164331 A1 | 6/2009 | Bishop et al. |
| 2009/0164614 A1 | 6/2009 | Christian et al. |
| 2009/0177667 A1 | 7/2009 | Ramos et al. |
| 2009/0182815 A1 | 7/2009 | Czechowski et al. |
| 2009/0182837 A1 | 7/2009 | Rogers |
| 2009/0182945 A1 | 7/2009 | Aviles et al. |
| 2009/0187575 A1 | 7/2009 | DaCosta |
| 2009/0198817 A1 | 8/2009 | Sundaram et al. |
| 2009/0204682 A1 | 8/2009 | Jeyaseelan et al. |
| 2009/0210549 A1 | 8/2009 | Hudson et al. |
| 2009/0233623 A1 | 9/2009 | Johnson |
| 2009/0241167 A1 | 9/2009 | Moore |
| 2009/0248786 A1* | 10/2009 | Richardson ....... H04L 29/12066 709/201 |
| 2009/0248787 A1* | 10/2009 | Sivasubramanian G06F 17/30887 709/201 |
| 2009/0248852 A1 | 10/2009 | Fuhrmann et al. |
| 2009/0248858 A1 | 10/2009 | Sivasubramanian et al. |
| 2009/0248893 A1* | 10/2009 | Richardson ........... H04L 67/327 709/239 |
| 2009/0249222 A1 | 10/2009 | Schmidt et al. |
| 2009/0253435 A1 | 10/2009 | Olofsson |
| 2009/0254661 A1 | 10/2009 | Fullagar et al. |
| 2009/0259971 A1 | 10/2009 | Rankine et al. |
| 2009/0271498 A1 | 10/2009 | Cable |
| 2009/0271577 A1 | 10/2009 | Campana et al. |
| 2009/0271730 A1 | 10/2009 | Rose et al. |
| 2009/0276771 A1* | 11/2009 | Nickolov .............. G06F 9/4856 717/177 |
| 2009/0279444 A1* | 11/2009 | Ravindran .......... H04L 41/5003 370/252 |
| 2009/0282038 A1 | 11/2009 | Subotin et al. |
| 2009/0287750 A1 | 11/2009 | Banavar et al. |
| 2009/0307307 A1 | 12/2009 | Igarashi |
| 2009/0327489 A1 | 12/2009 | Swildens et al. |
| 2009/0327517 A1* | 12/2009 | Sivasubramanian H04L 29/12132 709/238 |
| 2009/0327914 A1 | 12/2009 | Adar et al. |
| 2010/0005175 A1 | 1/2010 | Swildens et al. |
| 2010/0011061 A1 | 1/2010 | Hudson et al. |
| 2010/0011126 A1 | 1/2010 | Hsu et al. |
| 2010/0023601 A1* | 1/2010 | Lewin ..................... H04L 29/06 709/218 |
| 2010/0030662 A1 | 2/2010 | Klein |
| 2010/0030914 A1 | 2/2010 | Sparks et al. |
| 2010/0034470 A1 | 2/2010 | Valencia-Campo et al. |
| 2010/0036944 A1 | 2/2010 | Douglis et al. |
| 2010/0042725 A1 | 2/2010 | Jeon et al. |
| 2010/0057894 A1 | 3/2010 | Glasser |
| 2010/0070603 A1 | 3/2010 | Moss et al. |
| 2010/0082787 A1 | 4/2010 | Kommula et al. |
| 2010/0088367 A1 | 4/2010 | Brown et al. |
| 2010/0088405 A1 | 4/2010 | Huang et al. |
| 2010/0095008 A1 | 4/2010 | Joshi |
| 2010/0100629 A1 | 4/2010 | Raciborski et al. |
| 2010/0111059 A1 | 5/2010 | Bappu et al. |
| 2010/0115133 A1 | 5/2010 | Joshi |
| 2010/0115342 A1 | 5/2010 | Shigeta et al. |
| 2010/0121953 A1 | 5/2010 | Friedman et al. |
| 2010/0121981 A1 | 5/2010 | Drako |
| 2010/0122069 A1 | 5/2010 | Gonion |
| 2010/0125626 A1 | 5/2010 | Lucas et al. |
| 2010/0125673 A1* | 5/2010 | Richardson ....... H04L 29/12066 709/239 |
| 2010/0125675 A1* | 5/2010 | Richardson ....... H04L 29/12066 709/242 |
| 2010/0131646 A1 | 5/2010 | Drako |
| 2010/0138559 A1 | 6/2010 | Sullivan et al. |
| 2010/0150155 A1 | 6/2010 | Napierala |
| 2010/0161799 A1 | 6/2010 | Maloo |
| 2010/0169392 A1 | 7/2010 | Lev Ran et al. |
| 2010/0169452 A1 | 7/2010 | Atluri et al. |
| 2010/0174811 A1 | 7/2010 | Musiri et al. |
| 2010/0192225 A1 | 7/2010 | Ma et al. |
| 2010/0217801 A1 | 8/2010 | Leighton et al. |
| 2010/0223364 A1 | 9/2010 | Wei |
| 2010/0226372 A1 | 9/2010 | Watanabe |
| 2010/0228819 A1 | 9/2010 | Wei |
| 2010/0257024 A1 | 10/2010 | Holmes et al. |
| 2010/0257266 A1 | 10/2010 | Holmes et al. |
| 2010/0257566 A1 | 10/2010 | Matila |
| 2010/0268789 A1 | 10/2010 | Yoo et al. |
| 2010/0268814 A1 | 10/2010 | Cross et al. |
| 2010/0274765 A1 | 10/2010 | Murphy et al. |
| 2010/0281482 A1 | 11/2010 | Pike et al. |
| 2010/0293296 A1 | 11/2010 | Hsu et al. |
| 2010/0293479 A1 | 11/2010 | Rousso et al. |
| 2010/0299427 A1 | 11/2010 | Joshi |
| 2010/0299438 A1 | 11/2010 | Zimmerman et al. |
| 2010/0299439 A1 | 11/2010 | McCarthy et al. |
| 2010/0312861 A1* | 12/2010 | Kolhi ..................... H04L 67/28 709/219 |
| 2010/0318508 A1 | 12/2010 | Brawer et al. |
| 2010/0322255 A1 | 12/2010 | Hao et al. |
| 2010/0332595 A1 | 12/2010 | Fullagar et al. |
| 2011/0010244 A1 | 1/2011 | Hatridge |
| 2011/0029598 A1 | 2/2011 | Arnold et al. |
| 2011/0040893 A1 | 2/2011 | Karaoguz et al. |
| 2011/0055714 A1 | 3/2011 | Vemulapalli et al. |
| 2011/0055921 A1 | 3/2011 | Narayanaswamy et al. |
| 2011/0058675 A1 | 3/2011 | Brueck et al. |
| 2011/0072138 A1 | 3/2011 | Canturk et al. |
| 2011/0072366 A1 | 3/2011 | Spencer |
| 2011/0078000 A1 | 3/2011 | Ma et al. |
| 2011/0078230 A1 | 3/2011 | Sepulveda |
| 2011/0085654 A1 | 4/2011 | Jana et al. |
| 2011/0087769 A1 | 4/2011 | Holmes et al. |
| 2011/0096987 A1 | 4/2011 | Morales et al. |
| 2011/0113467 A1 | 5/2011 | Agarwal et al. |
| 2011/0153938 A1 | 6/2011 | Verzunov et al. |
| 2011/0153941 A1 | 6/2011 | Spatscheck et al. |
| 2011/0154318 A1 | 6/2011 | Oshins et al. |

(56) References Cited

U.S. PATENT DOCUMENTS

| | | |
|---|---|---|
| 2011/0161461 A1 | 6/2011 | Niven-Jenkins |
| 2011/0166935 A1 | 7/2011 | Armentrout et al. |
| 2011/0191445 A1 | 8/2011 | Dazzi |
| 2011/0191449 A1 | 8/2011 | Swildens et al. |
| 2011/0191459 A1 | 8/2011 | Joshi |
| 2011/0208876 A1 | 8/2011 | Richardson et al. |
| 2011/0208958 A1 | 8/2011 | Stuedi et al. |
| 2011/0209064 A1 | 8/2011 | Jorgensen et al. |
| 2011/0219120 A1 | 9/2011 | Farber et al. |
| 2011/0219372 A1 | 9/2011 | Agrawal et al. |
| 2011/0238501 A1 | 9/2011 | Almeida |
| 2011/0238793 A1 | 9/2011 | Bedare et al. |
| 2011/0239215 A1 | 9/2011 | Sugai |
| 2011/0252142 A1 | 10/2011 | Richardson et al. |
| 2011/0252143 A1 | 10/2011 | Baumback et al. |
| 2011/0258049 A1 | 10/2011 | Ramer et al. |
| 2011/0258614 A1 | 10/2011 | Tamm |
| 2011/0270964 A1 | 11/2011 | Huang et al. |
| 2011/0276623 A1 | 11/2011 | Girbal |
| 2011/0296053 A1 | 12/2011 | Medved et al. |
| 2011/0302304 A1 | 12/2011 | Baumback et al. |
| 2011/0320559 A1 | 12/2011 | Foti |
| 2012/0011190 A1 | 1/2012 | Driesen et al. |
| 2012/0036238 A1 | 2/2012 | Sundaram et al. |
| 2012/0066360 A1 | 3/2012 | Ghosh |
| 2012/0079115 A1 | 3/2012 | Richardson et al. |
| 2012/0089972 A1 | 4/2012 | Scheidel et al. |
| 2012/0096065 A1 | 4/2012 | Suit et al. |
| 2012/0124184 A1 | 5/2012 | Sakata et al. |
| 2012/0131177 A1 | 5/2012 | Brandt et al. |
| 2012/0136697 A1 | 5/2012 | Peles et al. |
| 2012/0143688 A1 | 6/2012 | Alexander |
| 2012/0159476 A1 | 6/2012 | Ramteke et al. |
| 2012/0166516 A1 | 6/2012 | Simmons et al. |
| 2012/0169646 A1 | 7/2012 | Berkes et al. |
| 2012/0173677 A1 | 7/2012 | Richardson et al. |
| 2012/0173760 A1 | 7/2012 | Jog et al. |
| 2012/0179817 A1 | 7/2012 | Bade et al. |
| 2012/0179839 A1 | 7/2012 | Raciborski et al. |
| 2012/0198043 A1 | 8/2012 | Hesketh et al. |
| 2012/0224516 A1 | 9/2012 | Stojanovski et al. |
| 2012/0233522 A1 | 9/2012 | Barton et al. |
| 2012/0233668 A1 | 9/2012 | Leafe et al. |
| 2012/0303785 A1 | 11/2012 | Sivasubramanian et al. |
| 2012/0303804 A1 | 11/2012 | Sundaram et al. |
| 2012/0311648 A1 | 12/2012 | Swildens et al. |
| 2012/0324089 A1 | 12/2012 | Joshi |
| 2013/0003735 A1 | 1/2013 | Chao et al. |
| 2013/0007100 A1 | 1/2013 | Trahan et al. |
| 2013/0007101 A1 | 1/2013 | Trahan et al. |
| 2013/0007102 A1 | 1/2013 | Trahan et al. |
| 2013/0007241 A1 | 1/2013 | Trahan et al. |
| 2013/0019311 A1 | 1/2013 | Swildens et al. |
| 2013/0041872 A1 | 2/2013 | Aizman et al. |
| 2013/0046869 A1 | 2/2013 | Jenkins et al. |
| 2013/0080420 A1 | 3/2013 | Taylor et al. |
| 2013/0080421 A1 | 3/2013 | Taylor et al. |
| 2013/0080576 A1 | 3/2013 | Taylor et al. |
| 2013/0080577 A1 | 3/2013 | Taylor et al. |
| 2013/0086001 A1 | 4/2013 | Bhogal et al. |
| 2013/0117849 A1 | 5/2013 | Golshan et al. |
| 2013/0130221 A1 | 5/2013 | Kortemeyer et al. |
| 2013/0133057 A1 | 5/2013 | Yoon et al. |
| 2013/0151646 A1 | 6/2013 | Chidambaram et al. |
| 2013/0198341 A1 | 8/2013 | Kim |
| 2013/0212300 A1 | 8/2013 | Eggleston et al. |
| 2013/0227165 A1 | 8/2013 | Liu |
| 2013/0246567 A1 | 9/2013 | Green et al. |
| 2013/0268616 A1 | 10/2013 | Sakata et al. |
| 2013/0305046 A1 | 11/2013 | Mankovski et al. |
| 2013/0311605 A1 | 11/2013 | Richardson et al. |
| 2013/0318153 A1 | 11/2013 | Sivasubramanian et al. |
| 2013/0339429 A1 | 12/2013 | Richardson et al. |
| 2013/0346567 A1 | 12/2013 | Richardson et al. |
| 2014/0006577 A1 | 1/2014 | Joe et al. |
| 2014/0007239 A1 | 1/2014 | Sharpe et al. |
| 2014/0019605 A1 | 1/2014 | Boberg |
| 2014/0036675 A1 | 2/2014 | Wang et al. |
| 2014/0040478 A1 | 2/2014 | Hsu et al. |
| 2014/0053022 A1 | 2/2014 | Forgette et al. |
| 2014/0059198 A1 | 2/2014 | Richardson et al. |
| 2014/0059379 A1 | 2/2014 | Ren et al. |
| 2014/0075109 A1 | 3/2014 | Richardson et al. |
| 2014/0089917 A1 | 3/2014 | Attalla et al. |
| 2014/0137111 A1 | 5/2014 | Dees et al. |
| 2014/0143320 A1 | 5/2014 | Sivasubramanian et al. |
| 2014/0165061 A1 | 6/2014 | Greene et al. |
| 2014/0257891 A1 | 9/2014 | Richardson et al. |
| 2014/0297870 A1 | 10/2014 | Eggleston et al. |
| 2014/0310402 A1 | 10/2014 | Giaretta et al. |
| 2014/0310811 A1 | 10/2014 | Hentunen |
| 2014/0325155 A1 | 10/2014 | Marshall et al. |
| 2014/0331328 A1 | 11/2014 | Wang et al. |
| 2014/0337472 A1 | 11/2014 | Newton et al. |
| 2014/0365666 A1 | 12/2014 | Richardson et al. |
| 2015/0067171 A1* | 3/2015 | Yum .................. H04L 67/2809 709/226 |
| 2015/0081842 A1 | 3/2015 | Richardson et al. |
| 2015/0172379 A1 | 6/2015 | Richardson et al. |
| 2015/0172407 A1 | 6/2015 | MacCarthaigh et al. |
| 2015/0172414 A1 | 6/2015 | Richardson et al. |
| 2015/0172415 A1 | 6/2015 | Richardson et al. |
| 2015/0180988 A1 | 6/2015 | Sivasubramanian et al. |
| 2015/0188994 A1 | 7/2015 | Marshall et al. |
| 2015/0195244 A1 | 7/2015 | Richardson et al. |
| 2015/0207733 A1 | 7/2015 | Richardson et al. |
| 2015/0215270 A1 | 7/2015 | Sivasubramanian et al. |
| 2015/0229710 A1 | 8/2015 | Sivasubramanian et al. |
| 2015/0249579 A1 | 9/2015 | Ellsworth et al. |
| 2015/0256647 A1 | 9/2015 | Richardson et al. |
| 2015/0319194 A1 | 11/2015 | Richardson et al. |
| 2015/0319260 A1 | 11/2015 | Watson |
| 2015/0334082 A1 | 11/2015 | Richardson et al. |
| 2016/0021197 A1* | 1/2016 | Pogrebinsky .......... H04L 67/16 709/226 |
| 2016/0026568 A1 | 1/2016 | Marshall et al. |
| 2016/0028644 A1 | 1/2016 | Richardson et al. |
| 2016/0041910 A1 | 2/2016 | Richardson et al. |
| 2016/0065665 A1 | 3/2016 | Richardson et al. |
| 2016/0072720 A1 | 3/2016 | Richardson et al. |

FOREIGN PATENT DOCUMENTS

| | | |
|---|---|---|
| CN | 1605182 A | 4/2005 |
| CN | 101189598 A | 5/2008 |
| CN | 101460907 A | 6/2009 |
| CN | 103731481 A | 4/2014 |
| EP | 1603307 A2 | 12/2005 |
| EP | 1351141 A2 | 10/2007 |
| EP | 2008167 | 12/2008 |
| JP | 2001-0506093 | 5/2001 |
| JP | 2001-249907 | 9/2001 |
| JP | 2002-044137 | 2/2002 |
| JP | 2003-167810 A | 6/2003 |
| JP | 2003-167813 A | 6/2003 |
| JP | 2003-522358 A | 7/2003 |
| JP | 2003188901 A | 7/2003 |
| JP | 2004-533738 A | 11/2004 |
| JP | 2005-537687 | 12/2005 |
| JP | 2007-133896 A | 5/2007 |
| JP | 2009-071538 A | 4/2009 |
| JP | 2012-509623 | 4/2012 |
| JP | 2012-209623 | 10/2012 |
| WO | WO 02/069608 A2 | 9/2002 |
| WO | WO 2005/071560 A1 | 8/2005 |
| WO | WO 2007/007960 A1 | 1/2007 |
| WO | WO 2007/126837 A3 | 11/2007 |
| WO | WO 2009124006 A2 | 10/2009 |
| WO | WO 2010/002603 A1 | 1/2010 |

(56) References Cited

FOREIGN PATENT DOCUMENTS

| WO | WO 2012/044587 | 4/2012 |
|---|---|---|
| WO | WO 2012/044587 A1 | 4/2012 |
| WO | WO 2012065641 A1 | 5/2012 |

OTHER PUBLICATIONS

Second Office Action in Chinese Application No. 201180046104.0 mailed Sep. 29, 2015.
Office Action in Canadian Application No. 2816612 dated Nov. 3, 2015.
Gunther et al, "Measuring Round Trip Times to determine the Distance between WLAN Nodes", Dec. 18, 2004, Technical University Berlin, all pages.
Examination Report in Singapore Application No. 201006874-0 dated May 16, 2012.
Second Office Action in Japanese Application No. 2011-516466 mailed Mar. 17, 2014.
Office Action in Japanese Application No. 2013-540982 dated Jun. 2, 2014 English Translation Not Yet Received.
Written Opinion in Singapore Application No. 201303521-7 dated May 20, 2014.
Office Action in Japanese Application No. 2013-123086 mailed Apr. 15, 2014 in 3 pages.
First Office Action in Chinese Application No. 200980111422.3 dated Apr. 13, 2012.
Second Office Action in Chinese Application No. 200980111426.1 mailed Dec. 25, 2013.
First Office Action in Japanese Application No. 2011-502139 dated Nov. 5, 2013.
Preliminary Examination in Chinese Application No. 201310717573.1 dated Feb. 25, 2014. English Translation Not Yet Received.
First Office Action in Japanese Application No. 2013-529454 mailed Feb. 3, 2014 in 6 pages.
First Office Action issued in Australian Application No. 2011307319 mailed Mar. 6, 2014 in 5 pages.
Office Action in Indian Application No. 3742/KOLNP/2008 dated Nov. 22, 2013.
Gunther et al, "Measuring Round Trip Times to determine the Distance between WLAN Nodes",May 2005, In Proc. of Networking 2005, all pages.
Kalafut et al., Understanding Implications of DNS Zone Provisioning., Proceeding IMC '08 Proceedings of the 8th AMC SIGCOMM conference on Internet measurement., pp. 211-216., ACM New York, NY, USA., 2008.
Supplementary European Search Report in Application No. 09729072.0 2266064 dated Dec. 10, 2014.
Fourth Office Action in Chinese Application No. 200980111426.1 mailed Jan. 15, 2015.
Decision of Refusal in Japanese Application No. 2011-516466 mailed Jan. 16, 2015.
Examination Report in Singapore Application No. 201301573-0 mailed Dec. 22, 2014.
Office Action in Japanese Application No. 2013-123086 mailed Dec. 2, 2014 in 2 pages.
Armour et al.: "A Heuristic Algorithm and Simulation Approach to Relative Location of Facilities"; Management Science, vol. 9, No. 2 (Jan. 1963); pp. 294-309.
Meng et al., "Improving the Scalability of Data Center Networks with Traffic-Aware Virtual Machine Placement"; Proceedings of the 29th Conference on Information Communications, INFOCOM'10, pp. 1154-1162. Piscataway, NJ. IEEE Press, 2010.
Search Report for European Application No. 09839809.2 dated May 11, 2015.
Third Office Action in Chinese Application No. 200980111426.1 mailed Jul. 7, 2014.
Decision of Rejection in Application No. 2011-502139 dated Jun. 30, 2014.
First Office Action in Japanese Application No. 2011-503091 dated Nov. 18, 2013.
Search Report and Written Opinion issued in Singapore Application No. 201006873-2 mailed on Oct. 12, 2011.
Search Report and Written Opinion in Singapore Application No. 201301573-0 mailed Jul. 1, 2014.
Horvath et al., "Enhancing Energy Efficiency in Multi-tier Web Server Clusters via Prioritization," in Parallel and Distributed Processing Symposium, 2007. IPDPS 2007. IEEE International , vol., No., pp. 1-6, Mar. 26-30, 2007.
Fifth Office Action in Chinese Application No. 200980111426.1 mailed Aug. 14, 2015.
Examination Report in Singapore Application No. 201103333-9 dated Aug. 13, 2013.
Office Action in Canadian Application No. 2741895 dated Oct. 21, 2013.
Office Action in Chinese Application No. 200980119993.1 dated Oct. 21, 2013.
Canonical Name (CNAME) DNS Records, domainavenue.com, Feb. 1, 2001, XP055153783, Retrieved from the Internet: URL:http://www.domainavenue.com/cname.htm [retrieved on Nov. 18, 2014].
"Content delivery network", Wikipedia, the free encyclopedia, Retrieved from the Internet: URL:http://en.wikipedia.org/w/index.php?title=Contentdelivery network&oldid=601009970, XP055153445, Mar. 24, 2008.
"Non-Final Office Action dated Jan. 3, 2012," U.S. Appl. No. 12/652,541; Jan. 3, 2012; 35 pages.
"Final Office Action dated Sep. 5, 2012," U.S. Appl. No. 12/652,541; Sep. 5, 2012; 40 pages.
"Notice of Allowance dated Jan. 4, 2013," U.S. Appl. No. 12/652,541; Jan. 4, 2013; 11 pages.
"Non-Final Office Action dated Apr. 30, 2014," U.S. Appl. No. 13/842,970; 20 pages.
"Final Office Action dated Aug. 19, 2014," U.S. Appl. No. 13/842,970; 13 pages.
"Notice of Allowance dated Dec. 5, 2014," U.S. Appl. No. 13/842,970; 6 pages.
Hartung et al.; Digital rights management and watermarking of multimedia content for m-commerce applications; Published in: Communications Magazine, IEEE (vol. 38, Issue: 11 ); Date of Publication: Nov. 2000; pp. 78-84; IEEE Xplore.
Mulligan et al.; How DRM-based content delivery systems disrupt expectations of "personal use"; Published in: Proceeding DRM '03 Proceedings of the 3rd ACM workshop on Digital rights management; 2003; pp. 77-89; ACM Digital Library.
First Office Action in Chinese Application No. 201180053405.6 dated May 3, 2015.
"Global Server Load Balancing with ServerIron," Foundry Networks, retrieved Aug. 30, 2007, from http://www.foundrynet.com/pdf/an-global-server-load-bal.pdf, 7 pages.
"Grid Computing Solutions," Sun Microsystems, Inc., retrieved May 3, 2006, from http://www.sun.com/software/grid, 3 pages.
"Grid Offerings," Java.net, retrieved May 3, 2006, from http://wiki.java.net/bin/view/Sungrid/OtherGridOfferings, 8 pages.
"Recent Advances Boost System Virtualization," eWeek.com, retrieved from May 3, 2006, http://www.eWeek.com/article2/0,1895,1772626,00.asp, 5 pages.
"Scaleable Trust of Next Generation Management (STRONG-MAN)," retrieved May 17, 2006, from http://www.cis.upenn.edu/~dsl/STRONGMAN/, 4 pages.
"Sun EDA Compute Ranch," Sun Microsystems, Inc., retrieved May 3, 2006, from http://sun.com/processors/ranch/brochure.pdf, 2 pages.
"Sun Microsystems Accelerates UltraSP ARC Processor Design Program With New Burlington, Mass. Compute Ranch," Nov. 6, 2002, Sun Microsystems, Inc., retrieved May 3, 2006, from http://www.sun.com/smi/Press/sunflash/2002-11/sunflash.20021106.3.xml, 2 pages.
"Sun N1 Grid Engine 6," Sun Microsystems, Inc., retrieved May 3, 2006, from http://www.sun.com/software/gridware/index.xml, 3 pages.

(56) References Cited

OTHER PUBLICATIONS

"Sun Opens New Processor Design Compute Ranch," Nov. 30, 2001, Sun Microsystems, Inc., retrieved May 3, 2006, from http://www.sun.com/smi/Press/sunflash/2001-11/sunflash.20011130.1.xml, 3 pages.

"The Softricity Desktop," Softricity, Inc., retrieved May 3, 2006, from http://www.softricity.com/products/, 3 pages.

"Xen—The Xen virtual Machine Monitor," University of Cambridge Computer Laboratory, retrieved Nov. 8, 2005, from http://www.cl.cam.ac.uk/Research/SRG/netos/xen/, 2 pages.

"XenFaq," retrieved Nov. 8, 2005, from http://wiki.xensource.com/xenwiki/XenFaq?action=print, 9 pages.

Abi, Issam, et al., "A Business Driven Management Framework for Utility Computing Environments," Oct. 12, 2004, HP Laboratories Bristol, HPL-2004-171, retrieved Aug. 30, 2007, from http://www.hpl.hp.com/techreports/2004/HPL-2004-171.pdf, 14 pages.

American Bar Association; Digital Signature Guidelines Tutorial [online]; Feb. 10, 2002 [retrived on Mar. 2, 2010]; American Bar Association Section of Science and Technology Information Security Committee; Retrieved from the internet: (URL: http://web.archive.org/web/20020210124615/www.abanet.org/scitech/ec/isc/dsg-tutorial.html; pp. 1-8.

Baglioni et al., "Preprocessing and Mining Web Log Data for Web Personalization", LNAI 2829, 2003, pp. 237-249.

Barbir, A., et al., "Known Content Network (CN) Request-Routing Mechanisms", Request for Comments 3568, [online], IETF, Jul. 2003, [retrieved on Feb. 26, 2013], Retrieved from the Internet: (URL: http://tools.ietf.org/rfc/rfc3568.txt).

Bellovin, S., "Distributed Firewalls," ;login;:37-39, Nov. 1999, http://www.cs.columbia.edu/-smb/papers/distfw. html, 10 pages, retrieved Nov. 11, 2005.

Blaze, M., "Using the KeyNote Trust Management System," Mar. 1, 2001, from http://www.crypto.com/trustmgt/kn.html, 4 pages, retrieved May 17, 2006.

Brenton, C., "What is Egress Filtering and How Can I Implement It?—Egress Filtering v 0.2," Feb. 29, 2000, SANS Institute, http://www.sans.org/infosecFAQ/firewall/egress.htm, 6 pages.

Byun et al., "A Dynamic Grid Services Deployment Mechanism for On-Demand Resource Provisioning", IEEE International Symposium on Cluster Computing and the Grid:863-870, 2005.

Chipara et al, "Realtime Power-Aware Routing in Sensor Network", IEEE, 2006, 10 pages.

Clark, C., "Live Migration of Virtual Machines," May 2005, NSDI '05: 2nd Symposium on Networked Systems Design and Implementation, Boston, MA, May 2-4, 2005, retrieved from http://www.usenix.org/events/nsdi05/tech/full_papers/clark/clark.pdf, 14 pages.

Coulson, D., "Network Security Iptables," Apr. 2003, Linuxpro, Part 2, retrieved from http://davidcoulson.net/writing/lxf/38/iptables.pdf, 4 pages.

Coulson, D., "Network Security Iptables," Mar. 2003, Linuxpro, Part 1, retrieved from http://davidcoulson.net/writing/lxf/39/iptables.pdf, 4 pages.

Deleuze, C., et al.,—A DNS Based Mapping Peering System for Peering CDNs, draft-deleuze-cdnp-dnsmap-peer-00.txt, Nov. 20, 2000, 20 pages.

Demers, A., "Epidemic Algorithms for Replicated Database Maintenance," 1987, Proceedings of the sixth annual ACM Symposium on Principles of Distributed Computing, Vancouver, British Columbia, Canada, Aug. 10-12, 1987, 12 pages.

First Office Action in Chinese Application No. 200980111426.1 mailed Feb. 16, 2013.

First Office Action in Chinese Application No. 200980119993.1 dated Jul. 4, 2012.

First Office Action in Chinese Application No. 200980119995.0 dated Jul. 6, 2012.

First Office Action in Chinese Application No. 200980145872.4 dated Nov. 29, 2012.

Gruener, J., "A Vision of Togetherness," May 24, 2004, NetworkWorld, retrieved May 3, 2006, from, http://www.networkworld.com/supp/2004/ndc3/0524virt.html, 9 pages.

International Preliminary Report on Patentability in PCT/US2007/007601 mailed Sep. 30, 2008 in 8 pages.

International Preliminary Report on Patentability in PCT/US2011/053302 mailed Apr. 2, 2013.

International Preliminary Report on Patentability in PCT/US2011/061486 mailed May 22, 2013.

International Search Report and Written Opinion in PCT/US07/07601 mailed Jul. 18, 2008 in 11 pages.

International Search Report and Written Opinion in PCT/US2011/053302 mailed Nov. 28, 2011 in 11 pages.

International Search Report and Written Opinion in PCT/US2011/061486 mailed Mar. 30, 2012 in 11 pages.

Ioannidis, S., et al., "Implementing a Distributed Firewall," Nov. 2000, (ACM) Proceedings of the ACM Computer and Communications Security (CCS) 2000, Athens, Greece, pp. 190-199, retrieved from http://www.cis.upenn.edu/~dls/STRONGMAN/Papers/df.pdf, 10 pages.

Joseph, Joshy, et al., "Introduction to Grid Computing," Apr. 16, 2004, retrieved Aug. 30, 2007, from http://www.informit.com/articles/printerfriendly.aspx?p=169508, 19 pages.

Kenshi, P., "Help File Library: Iptables Basics," Justlinux, retrieved Dec. 1, 2005, from http://www.justlinux.com/nhf/Security/Iptables_Basics.html, 4 pages.

Liu et al., "Combined mining of Web server logs and web contents for classifying user navigation patterns and predicting users' future requests," Data & Knowledge Engineering 61 (2007) pp. 304-330.

Maesono, et al., "A Local Scheduling Method considering Data Transfer in Data Grid," Technical Report of IEICE, vol. 104, No. 692, pp. 435-440, The Institute of Electronics, Information and Communication Engineers, Japan, Feb. 2005.

Office Action in Canadian Application No. 2726915 dated May 13, 2013.

Office Action in Canadian Application No. 2741895 dated Feb. 25, 2013.

Office Action in Chinese Application No. 200780020255.2 dated Mar. 4, 2013.

Office Action in Chinese Application No. 200980119995.0 dated Apr. 15, 2013.

Office Action in Japanese Application No. 2011-502138 mailed Feb. 1, 2013.

Office Action in Japanese Application No. 2011-502140 mailed Dec. 7, 2012.

Office Action in Japanese Application No. 2011-516466 mailed Mar. 6, 2013.

Office Action in Japanese Application No. 2012-052264 mailed Dec. 11, 2012 in 26 pages.

Office Action in Korean Application No. 10-2011-7002461 mailed May 29, 2013.

Preliminary Examination in Chinese Application No. 201180053405.6 dated May 28, 2013. English Translation Not Yet Received.

Search Report and Written Opinion in Singapore Application No. 201103333-9 mailed Nov. 19, 2012.

Second Office Action in Chinese Application No. 200980119993.1 dated Mar. 12, 2013.

Shankland, S., "Sun to buy start-up to bolster N1 ," Jul. 30, 2003, CNet News.com, retrieved May 3, 2006, http://news.zdnet.com/2100-3513_22-5057752.html, 8 pages.

Singapore Examination Report in Application No. 201006837-7 mailed May 16, 2012.

Singapore Written Opinion in Application No. 201006836-9, mailed Apr. 30, 2012 in 10 pages.

Singapore Written Opinion in Application No. 201006836-9, mailed Oct. 12, 2011 in 12 pages.

Singapore Written Opinion in Application No. 201006837-7, mailed Oct. 12, 2011 in 11 pages.

Singapore Written Opinion in Application No. 201006874-0, mailed Oct. 12, 2011 in 10 pages.

Strand, L., "Adaptive distributed firewall using intrusion detection," Nov. 1, 2004, University of Oslo Department of Informatics,

(56) References Cited

OTHER PUBLICATIONS retrieved Mar. 8, 2006, from http://gnist.org/~lars/studies/master/StrandLars-master.pdf, 158 pages.
Supplementary European Search Report in Application No. 07754164.7 mailed Dec. 20, 2010 in 7 pages.
Supplementary European Search Report in Application No. 09727694.3 mailed Jan. 30, 2012 in 6 pages.
Supplementary European Search Report in Application No. 09728756.9 mailed Jan. 8, 2013.
Takizawa, et al., "Scalable MultiReplication Framework on the Grid," Report of Study of Information Processing Society of Japan, Information Processing Society, vol. 2004, No. 81, pp. 247-252, Japan, Aug. 1, 2004.
Tan et al., "Classification: Basic Concepts, Decision Tree, and Model Evaluation", Introduction in Data Mining; http://www-users.cs.umn.edu/~kumar/dmbook/ch4.pdf, 2005, pp. 245-205.
Van Renesse, R., "Astrolabe: A Robust and Scalable Technology for Distributed System Monitoring, Management, and Data Mining," May 2003, ACM Transactions on Computer Systems (TOCS), 21 (2): 164-206, 43 pages.
Vijayan, J., "Terraspring Gives Sun's N1 a Boost," Nov. 25, 2002, Computerworld, retrieved May 3, 2006, from http://www.computerworld.com/printthis/2002/0,4814,76159,00.html, 3 pages.
Virtual Iron Software Home, Virtual Iron, retrieved May 3, 2006, from http://www.virtualiron.com/, 1 page.
Waldspurger, CA., "Spawn: A Distributed Computational Economy," Feb. 1992, IEEE Transactions on Software Engineering, 18(2): 103-117, I5 pages.
Watanabe, et al., "Remote Program Shipping System for GridRPC Systems," Report of Study of Information Processing Society of Japan, Information Processing Society, vol. 2003, No. 102, pp. 73-78, Japan, Oct. 16, 2003.
Xu et al., "Decision tree regression for soft classification of remote sensing data", Remote Sensing of Environment 97 (2005) pp. 322-336.
Yamagata, et al., "A virtual-machine based fast deployment tool for Grid execution environment," Report of Study of Information Processing Society of Japan, Information Processing Society, vol. 2006, No. 20, pp. 127-132, Japan, Feb. 28, 2006.
Zhu, Xiaoyun, et al., "Utility-Driven Workload Management Using Nested Control Design," Mar. 29, 2006, HP Laboratories Palo Alto, HPL-2005-193(R.1), retrieved Aug. 30, 2007, from http://www.hpl.hp.com/techreports/2005/HPL-2005-193R1.pdf, 9 pages.
Kato, Yoshinobu , Server load balancer—Difference in distribution technique and supported protocol—Focus on function to meet the needs, Nikkei Communications, Japan, Nikkei Business Publications, Inc., Mar. 20, 2000, vol. 314, pp. 114 to 123.
Sharif et al, "Secure In-VM Monitoring Using Hardware Virtualization", Microsoft, Oct. 2009 http://research.microsoft.com/pubs/153179/sim-ccs09.pdf; 11 pages.
First Office Action is Chinese Application No. 200980125551.8 mailed Jul. 4, 2012.
Office Action in Japanese Application No. 2013-529454 mailed Mar. 9, 2015 in 8 pages.
First Office Action in Chinese Application No. 201180046104.0 mailed Nov. 3, 2014.
Second Office Action in Chinese Application No. 201180053405.6 dated Dec. 4, 2015.
Office Action in European Application No. 07754164.7 dated Dec. 14, 2015.

\* cited by examiner

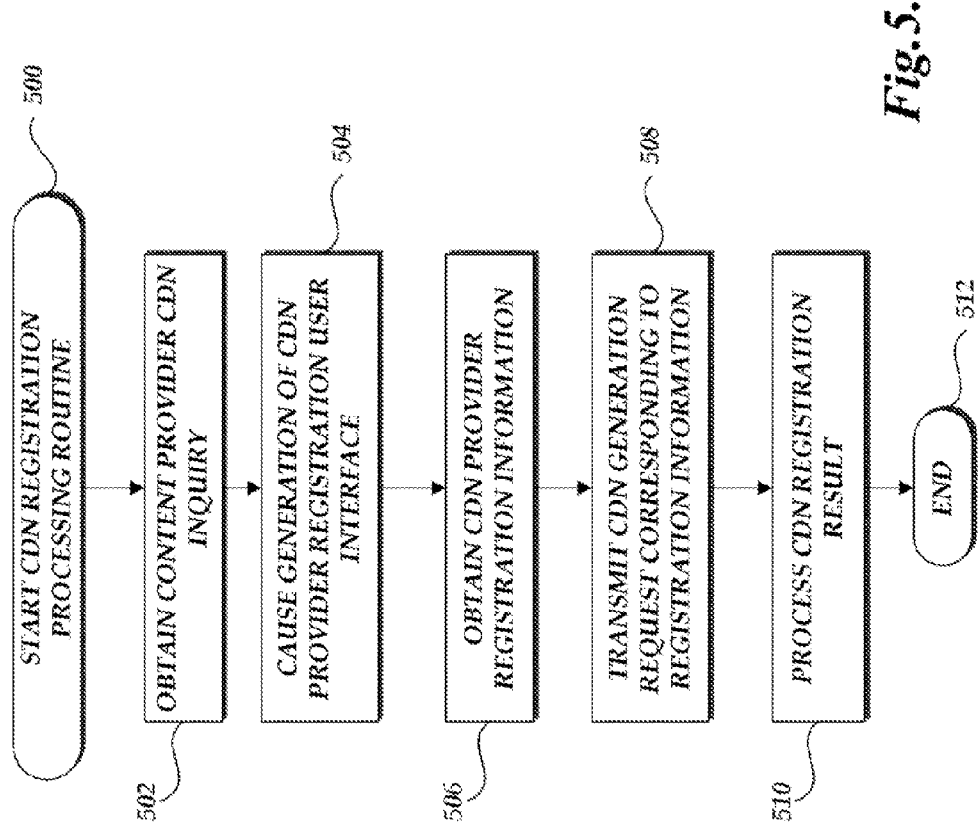

MANAGING CDN REGISTRATION BY A STORAGE PROVIDER

CROSS-REFERENCE TO RELATED APPLICATIONS

This application is a continuation of U.S. patent application Ser. No. 13/620,945, entitled "MANAGING CDN REGISTRATION BY A STORAGE PROVIDER" and filed Sep. 15, 2012, which in turn is a continuation of U.S. patent application Ser. No. 13/296,156, now U.S. Pat. No. 8,301,748, entitled "MANAGING CDN REGISTRATION BY A STORAGE PROVIDER" and filed Nov. 14, 2011, which is a continuation of U.S. patent application Ser. No. 12/272,666, now U.S. Pat. No. 8,060,616, entitled "MANAGING CDN REGISTRATION BY A STORAGE PROVIDER" and filed Nov. 17, 2008, the disclosures of which are incorporated herein by reference.

BACKGROUND

Generally described, computing devices and communication networks can be utilized to exchange information. In a common application, a computing device can request content from another computing device via the communication network. For example, a user at a personal computing device can utilize a software browser application to request a Web page from a server computing device via the Internet. In such embodiments, the user computing device can be referred to as a client computing device and the server computing device can be referred to as a content provider.

Content providers are generally motivated to provide requested content to client computing devices often with consideration of efficient transmission of the requested content to the client computing device and/or consideration of a cost associated with the transmission of the content. For larger scale implementations, a content provider may receive content requests from a high volume of client computing devices which can place a strain on the content provider's computing resources. Additionally, the content requested by the client computing devices may have a number of components, which can further place additional strain on the content provider's computing resources.

With reference to an illustrative example, a requested Web page, or original content, may be associated with a number of additional resources, such as images or videos, which are to be displayed with the Web page. In one specific embodiment, the additional resources of the Web page are identified by a number of embedded resource identifiers, such as uniform resource locators ("URLs"). In turn, software on the client computing devices typically processes embedded resource identifiers to generate requests for the content. Often, the resource identifiers associated with the embedded resources reference a computing device associated with the content provider such that the client computing device would transmit the request for the additional resources to the referenced content provider computing device. Accordingly, in order to satisfy a content request, the content provider(s) (or any service provider on behalf of the content provider(s)) would provide client computing devices data associated with the Web page and/or the data associated with the embedded resources.

Some content providers attempt to facilitate the delivery of requested content, such as Web pages and/or resources identified in Web pages, through the utilization of a network storage provider or a content delivery network ("CDN") service provider. A network storage provider and a CDN server provider each typically maintains a number of computing devices in a communication network that can maintain content from various content providers. In turn, content providers can instruct, or otherwise suggest to, client computing devices to request some, or all, of the content provider's content from the network storage provider's or CDN service provider's computing devices.

As with content providers, network storage providers and CDN service providers are also generally motivated to provide requested content to client computing devices often with consideration of efficient transmission of the requested content to the client computing device and/or consideration of a cost associated with the transmission of the content. Accordingly, CDN service providers often consider factors such as latency of delivery of requested content in order to meet service level agreements or to generally improve the quality of delivery service.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 5 is a flow diagram illustrative of a CDN registration processing routine implemented by a network storage provider.

DETAILED DESCRIPTION

Generally described, the present disclosure is directed to managing registration of a content provider or one or more resources associated with a content provider with a content delivery network ("CDN") service provider. Specifically, aspects of the disclosure will be described with regard to the management and processing of CDN registration requests made to a network storage provider by a content provider. Although various aspects of the disclosure will be described with regard to illustrative examples and embodiments, one skilled in the art will appreciate that the disclosed embodiments and examples should not be construed as limiting.

Figure 1:
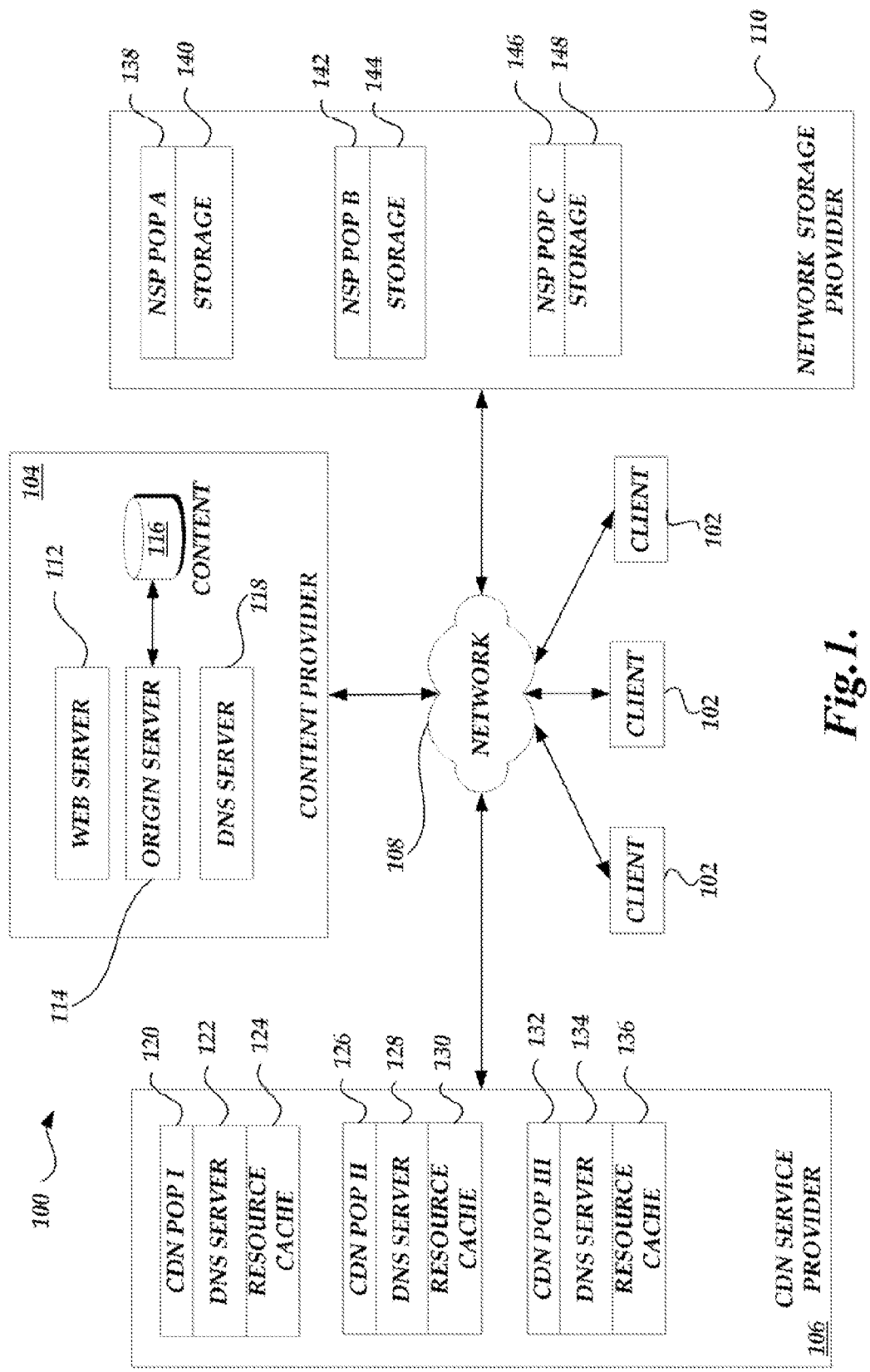
FIG. 1 is a block diagram illustrative of content delivery environment including a number of client computing devices, a content provider, a network storage provider, and a content delivery network service provider.

FIG. 1 is a block diagram illustrative of content delivery environment 100 for the managing registration of content with a CDN service provider and subsequent processing of content requests. As illustrated in FIG. 1, the content delivery environment 100 includes a number of client computing devices 102 (generally referred to as clients) for requesting content from a content provider, a network storage provider 110, and/or a CDN service provider 106. In an illustrative embodiment, the client computing devices 102 can correspond to a wide variety of computing devices including personal computing devices, laptop computing devices, hand-held computing devices, terminal computing devices, mobile devices, wireless devices, various electronic devices and appliances and the like. In an illustrative embodiment, the client computing devices 102 include necessary hardware and software components for establishing communications over a communication network 108, such as a wide area network or local area network. For example, the client computing devices 102 may be equipped with networking equipment and browser software applications that facilitate communications via the Internet or an intranet.

Although not illustrated in FIG. 1, each client computing device 102 utilizes some type of local DNS resolver component, such as a DNS Name server, that generates DNS queries attributed to the client computing device. In one embodiment, the local DNS resolver component may be provide by an enterprise network to which the client computing device 102 belongs. In another embodiment, the local DNS resolver component may be provided by an Internet Service Provider (ISP) that provides the communication network connection to the client computing device 102.

The content delivery environment 100 can also include a content provider 104 in communication with the one or more client computing devices 102 via the communication network 108. The content provider 104 illustrated in FIG. 1 corresponds to a logical association of one or more computing devices associated with a content provider. Specifically, the content provider 104 can include a web server component 112 corresponding to one or more server computing devices for obtaining and processing requests for content (such as Web pages) from the client computing devices 102. The content provider 104 can further include an origin server component 114 and associated storage component 116 corresponding to one or more computing devices for obtaining and processing requests for network resources. One skilled in the relevant art will appreciate that the content provider 104 can be associated with various additional computing resources, such additional computing devices for administration of content and resources, DNS name servers, and the like. For example, as further illustrated in FIG. 1, the content provider 104 can be associated with one or more DNS name server components 118 that are operative to receive DNS queries related to registered domain names associated with the content provider. The one or more DNS name servers can be authoritative to resolve client computing device DNS queries corresponding to the registered domain names of the content provider 104. A DNS name server component is considered to be authoritative to a DNS query if the DNS name server can resolve the query by providing a responsive IP address.

With continued reference to FIG. 1, the content delivery environment 100 can further include a CDN service provider 106 in communication with the one or more client computing devices 102, the content provider 104, and the network storage provider 110 via the communication network 108. The CDN service provider 106 illustrated in FIG. 1 corresponds to a logical association of one or more computing devices associated with a CDN service provider. Specifically, the CDN service provider 106 can include a number of Point of Presence ("POP") locations 120, 126, 132 that correspond to nodes on the communication network 108. Each POP 120, 126, 132 includes a DNS component 122, 128, 134 made up of a number of DNS server computing devices for resolving DNS queries from the client computers 102. Each POP 120, 126, 132 also includes a resource cache component 124, 130, 136 made up of a number of cache server computing devices for storing resources from content providers or network storage providers and transmitting various requested resources to various client computers. The DNS components 122, 128, 134 and the resource cache components 124, 130, 136 may further include additional software and/or hardware components that facilitate communications including, but not limited, load balancing or load sharing software/hardware components.

In an illustrative embodiment, the DNS component 122, 128, 134 and resource cache component 124, 130, 136 are considered to be logically grouped, regardless of whether the components, or portions of the components, are physically separate. Additionally, although the POPs 120, 126, 132 are illustrated in FIG. 1 as logically associated with the CDN service provider 106, the POPs will be geographically distributed throughout the communication network 108 in a manner to best serve various demographics of client computing devices 102. Additionally, one skilled in the relevant art will appreciate that the CDN service provider 106 can be associated with various additional computing resources, such additional computing devices for administration of content and resources, and the like.

With further continued reference to FIG. 1, the content delivery environment 100 can also include a network storage provider 110 in communication with the one or more client computing devices 102, the CDN service provider 106, and the content provider 104 via the communication network 108. The network storage provider 110 illustrated in FIG. 1 also corresponds to a logical association of one or more computing devices associated with a network storage provider. Specifically, the network storage provider 110 can include a number of network storage provider Point of Presence ("NSP POP") locations 138, 142, 146 that correspond to nodes on the communication network 108. Each NSP POP 138, 142, 146 includes a storage component 140, 144, 148 made up of a number of storage devices for storing resources from content providers which will be processed by the network storage provider 110 and transmitted to various client computers. The storage components 140, 144, 148 may further include additional software and/or hardware components that facilitate communications including, but not limited to, load balancing or load sharing software/hardware components.

In an illustrative embodiment, the storage components 140, 144, 148 are considered to be logically grouped, regardless of whether the components, or portions of the components, are physically separate. Additionally, although the NSP POPs 138, 142, 146 are illustrated in FIG. 1 as logically associated with the network storage provider 110, the NSP POPs will be geographically distributed throughout the communication network 108 in a manner to best serve various demographics of client computing devices 102. Additionally, one skilled in the relevant art will appreciate that the network storage provider 110 can be associated with various additional computing resources, such additional computing devices for administration of content and resources, DNS name servers, and the like. For example, the network storage provider 110 can be associated with one or more DNS name server components that are operative to receive DNS queries related to registered domain names associated with the network storage provider 110. The one or more DNS name servers can be authoritative to resolve client computing device DNS queries corresponding to the registered domain names of the network storage provider 110. As similarly set forth above, a DNS name server component is considered to be authoritative to a DNS query if the DNS name server can resolve the query by providing a responsive IP address.

Even further, one skilled in the relevant art will appreciate that the components of the network storage provider 110 and components of the CDN service provider 106 can be managed by the same or different entities. One skilled in the relevant art will also appreciate that the components and configurations provided in FIG. 1 are illustrative in nature. Accordingly, additional or alternative components and/or configurations, especially regarding the additional components, systems and subsystems for facilitating communications may be utilized.

With reference now to FIGS. 2-4B, the interaction between various components of the content delivery environment 100 of FIG. 1 will be illustrated. For purposes of the example, however, the illustration has been simplified such that many of the components utilized to facilitate communications are not shown. One skilled in the relevant art will appreciate that such components can be utilized and that additional interactions would accordingly occur without departing from the spirit and scope of the present disclosure.

Figure 2:
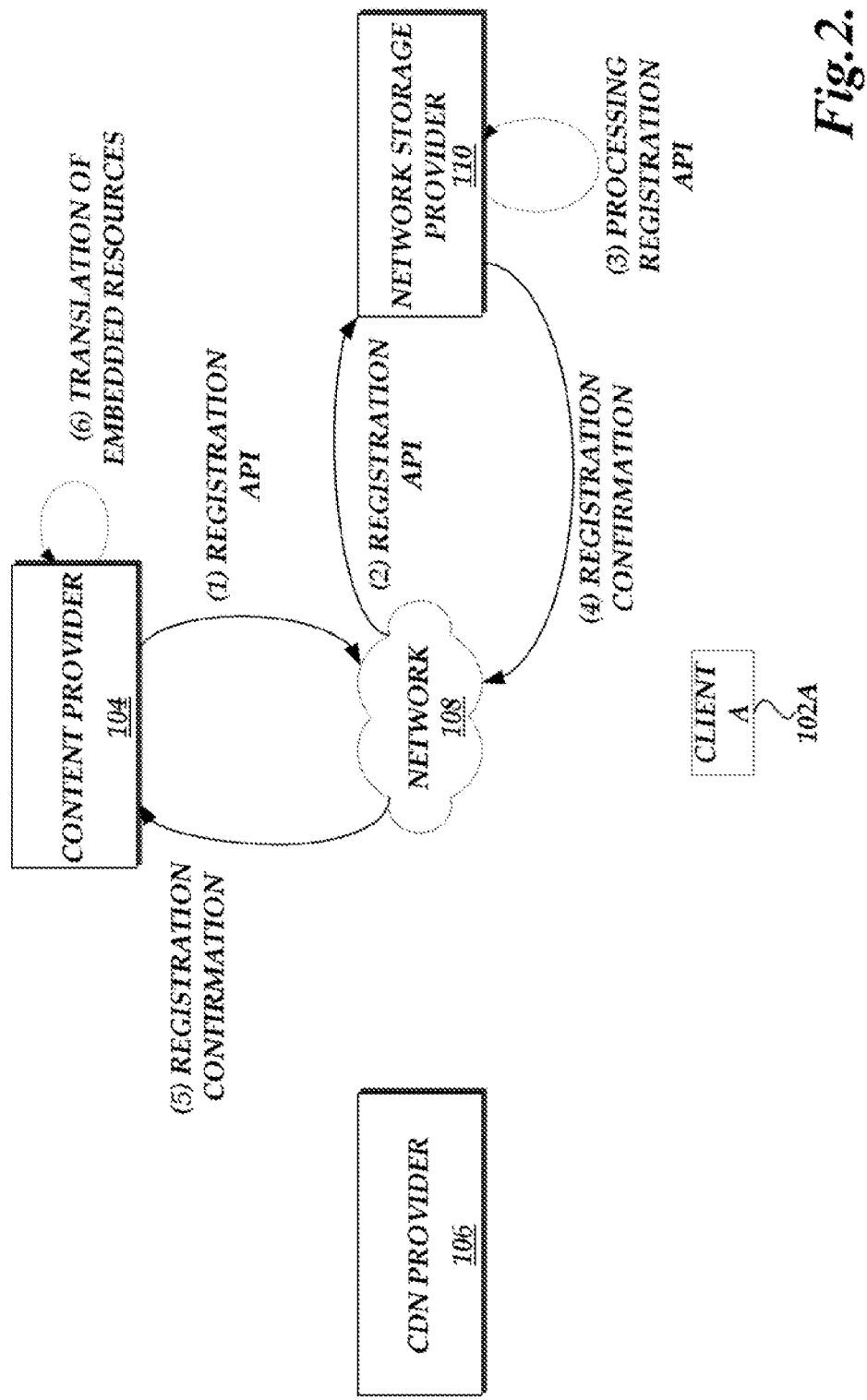
FIG. 2 is a block diagram of the content delivery environment of FIG. 1 illustrating the registration of a content provider with a network storage provider.

With reference to FIG. 2, an illustrative interaction for registration of a content provider 104 with the network storage provider 110 will be described. As illustrated in FIG. 2, the storage provider content registration process begins with registration of the content provider 104 with the network storage provider 110. In an illustrative embodiment, the content provider 104 utilizes a registration application program interface ("API") to register with the network storage provider 110 such that the network storage provider 110 can provide content on behalf of the content provider 104. The registration API can include the identification of the origin server 114 of the content provider 104 that may provide requested resources to the network storage provider 110. In addition or alternatively, the registration API can include the content to be stored by the network storage provider 110 on behalf of the content provider 104. In one embodiment, the network storage provider 110 may act as an origin server for the content provider 104.

One skilled in the relevant art will appreciate that upon storage of the content by the network storage provider 110, the content provider 104 can begin to direct requests for content from client computing devices 102 to the network storage provider 110. Specifically, in accordance with DNS routing principles, a client computing device request corresponding to a resource identifier would eventually be directed toward a storage component 140, 144, 148 of a NSP POP 138, 142, 146 associated with the network storage provider 110.

With continued reference to FIG. 2, upon receiving the registration API, the network storage provider 110 obtains and processes the content provider registration information. In an illustrative embodiment, the network storage provider 110 can then generate additional information that will be used by the client computing devices 102 as part of the content requests. The additional information can include, without limitation, content provider identifiers, such as content provider identification codes, storage provider identifiers, such as storage provider identification codes, executable code for processing resource identifiers, such as script-based instructions, and the like. One skilled in the relevant art will appreciate that various types of additional information may be generated by the network storage provider 110 and that the additional information may be embodied in anyone of a variety of formats.

In one embodiment, the network storage provider 110 returns an identification of applicable domains for the network storage provider (unless it has been previously provided) and any additional information to the content provider 104. In turn, the content provider 104 can then process the stored content with content provider specific information. In one example, as illustrated in FIG. 2, the content provider 104 translates resource identifiers originally directed toward a domain of the origin server 114 to a domain corresponding to the network storage provider 110. The translated URLs are embedded into requested content in a manner such that DNS queries for the translated URLs will resolve to a DNS server corresponding to the network storage provider 110 and not a DNS server corresponding to the content provider 104.

Generally, the identification of the resources originally directed to the content provider 104 will be in the form of a resource identifier that can be processed by the client computing device 102, such as through a browser software application. In an illustrative embodiment, the resource identifiers can be in the form of a uniform resource locator ("URL"). Because the resource identifiers are included in the requested content directed to the content provider, the resource identifiers can be referred to generally as the "content provider URL." For purposes of an illustrative example, the content provider URL can identify a domain of the content provider 104 (e.g., contentprovider.com), a name of the resource to be requested (e.g., "resource.xxx") and a path where the resource will be found (e.g., "path"). In this illustrative example, the content provider URL has the form of:

http://www.contentprovider.com/path/resource.xxx

During an illustrative translation process, the content provider URL is modified such that requests for the resources associated with the modified URLs resolve to a POP associated with the network storage provider 110. In one embodiment, the modified URL identifies the domain of the network storage provider 110 (e.g., "storageprovider.com"), the same name of the resource to be requested (e.g., "resource.xxx") and the same path where the resource will be found (e.g., "path"). Additionally, the modified URL can include additional processing information (e.g., "additional information"). The modified URL would have the form of:

http://additional_information.storageprovider.com/path/resource.xxx

Figure 3A:
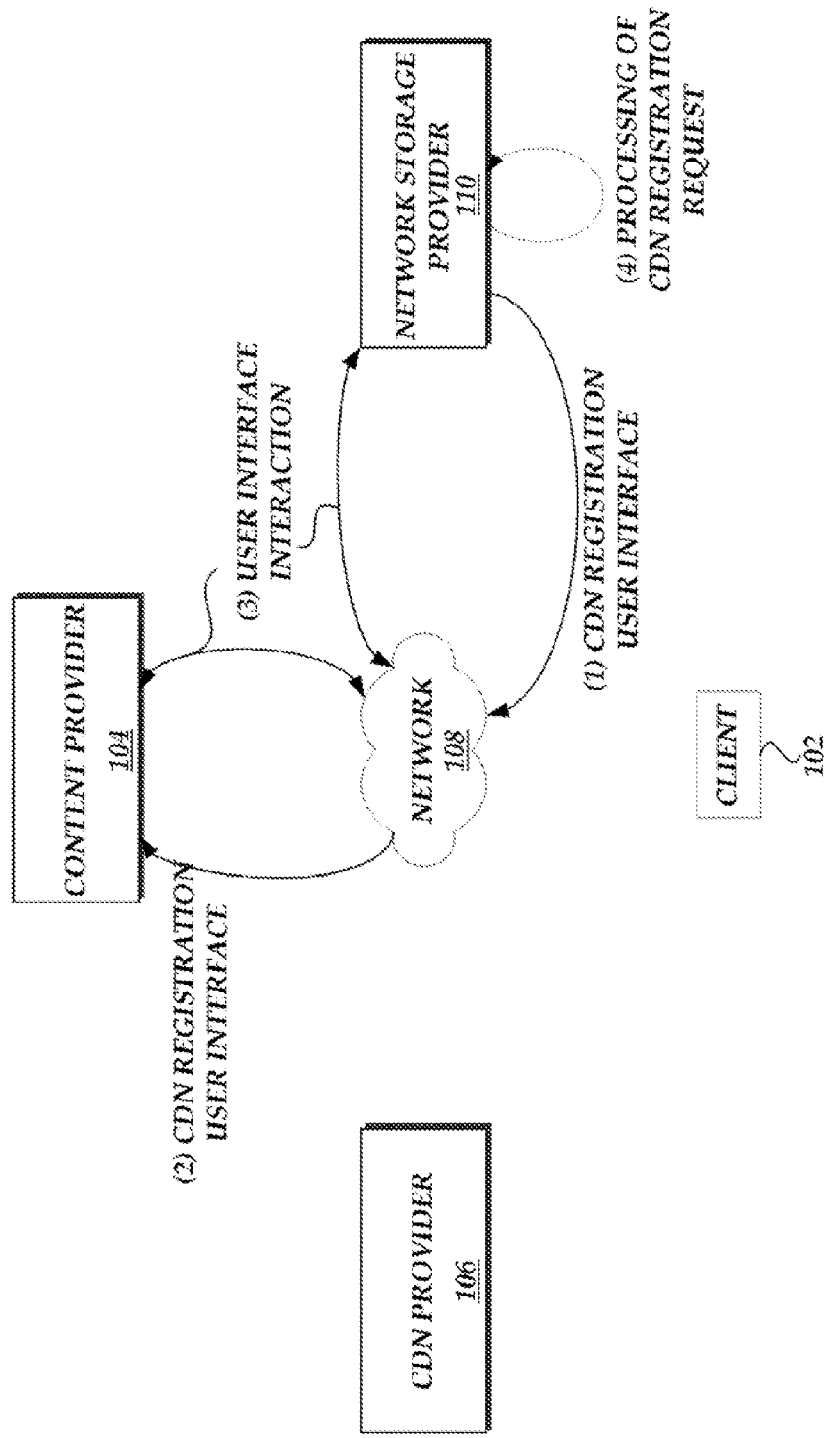
FIG. 3A is a block diagram of the content delivery environment of FIG. 1 illustrating the generation and processing of a CDN registration request from a content provider to a network storage provider.

In another embodiment, the information associated with the network storage provider 110 is included in the modified URL, such as through prepending or other techniques, such that the translated URL can maintain all of the information associated with the original URL. In this embodiment, the translated URL would have the form of:

http://additional_information.storageprovider.com/www.contentprovider.com/path/resource.xxx With reference now to FIG. 3A, after completion of the network storage provider registration and translation processes illustrated in FIG. 2, the network storage provider 110 subsequently causes the generation of a user interface or an API call to the content provider 104 for use in determining whether the content provider 104 desires to register one or more of the resources currently hosted by the network storage provider 110 with a CDN service provider. The content provider 104 receives the CDN registration user interface, such as the user interface that will be described in further detail below in reference to FIG. 6, or the API call from the network storage provider 110 via network 108. In an illustrative embodiment, the CDN registration user interface can correspond to a Web page that is displayed on a computing device associated with the content provider 104, via the processing of information, such as hypertext markup language ("HTML"), extensible markup language ("XML"), and the like. As will be described further below in reference to FIGS. 5 and 6, the CDN registration user interface provides the content provider 104 an option whether to have one or more of the resources currently hosted by the network storage provider 110 on behalf of the content provider 104 with a CDN service provider in the alternative. In the alternative, an API call would similarly provide the content provider 104 with an option to have one or more resources hosted by a CDN service provider.

In one embodiment, upon receipt of the CDN registration user interface, the content provider 104, such as through a browser software application, processes any of the markup code included in the CDN registration user interface. The CDN registration user interface provides a CDN selection component that the content provider 104 can select to send a request to the network storage provider 110 via network 108 to publish one or more resources to a CDN service provider. Upon selection of the CDN selection component, the content provider 104 sends a corresponding CDN registration request to the network storage provider 110 via network 108. As will also be further described below, other user interface interaction information may also be provided to the network storage provider 110. For example, the content provider 104 may identify various CDN selection criteria, such as a regional service plan or a service level plan associated with a CDN service provider, via the CDN registration user interface. The network storage service provider 110 receives and processes the CDN registration request together with any additional information provided by the content provider 104.

Figure 3B:
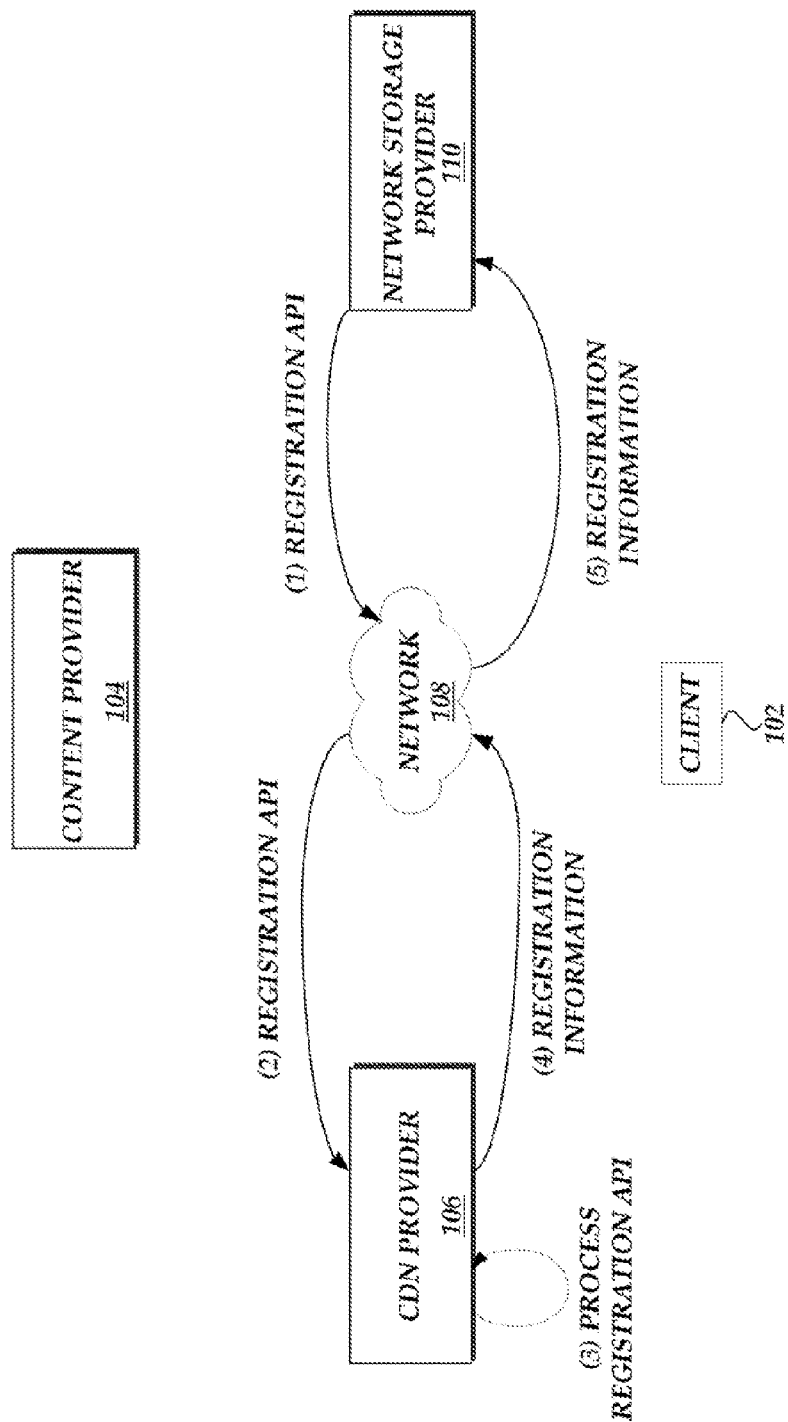
FIG. 3B is a block diagram of the content delivery environment of FIG. 1 illustrating the registration, by a network storage provider, of one or more resources with a content delivery network service provider.

With reference now to FIG. 3B, an illustrative interaction for registration, by the network storage provider 110, of the one or more resources associated with a content provider 104 with the CDN service provider 106 will be described. As illustrated in FIG. 3B, the CDN content registration process begins with registration of the one or more resources stored by the network storage provider 110 on behalf of the content provider 104 with the CDN service provider 106. In an illustrative embodiment, the network storage provider 110 utilizes a registration application program interface ("API") to register with the CDN service provider 106 such that the CDN service provider 106 can provide the one or more resources on behalf of the network storage provider 110 and further on behalf of the content provider 104. The registration API includes the identification of the storage component 140, 144, 148 of the network storage provider 110 that will provide requested resources to the CDN service provider 106.

One skilled in the relevant art will appreciate that upon identification of appropriate storage component 140, 144, 148 of the network storage provider 110, the content provider 104 can, in one embodiment as will be further described below in reference to FIG. 4A, begin to direct requests for content from client computing devices 102 to the CDN service provider 106. Specifically, in accordance with DNS routing principles, a client computing device request corresponding to a resource identifier would eventually be directed toward a POP 120, 126, 132 associated with the CDN service provider 106. In the event that the resource cache component 124, 130, 136 of a selected POP does not have a copy of a resource requested by a client computing device 102, the resource cache component will request the resource from the storage component 140, 144, 148 of the network storage provider 110 previously registered by the content provider 104.

With continued reference to FIG. 3B, upon receiving the registration API, the CDN service provider 106 obtains and processes the registration information. In an illustrative embodiment, the CDN service provider 106 can then generate additional information that will be used by the client computing devices 102 as part of the content requests. The additional information can include, without limitation, content provider identifiers, such as content provider identification codes, CDN identifiers, such as CDN identification codes, executable code for processing resource identifiers, such as script-based instructions, and the like. One skilled in the relevant art will appreciate that various types of additional information may be generated by the CDN service provider 106 and that the additional information may be embodied in anyone of a variety of formats. The CDN service provider 106 then returns an identification of applicable domains for the CDN service provider (unless it has been previously provided) and any additional information to the network storage provider 110.

Figure 4A:
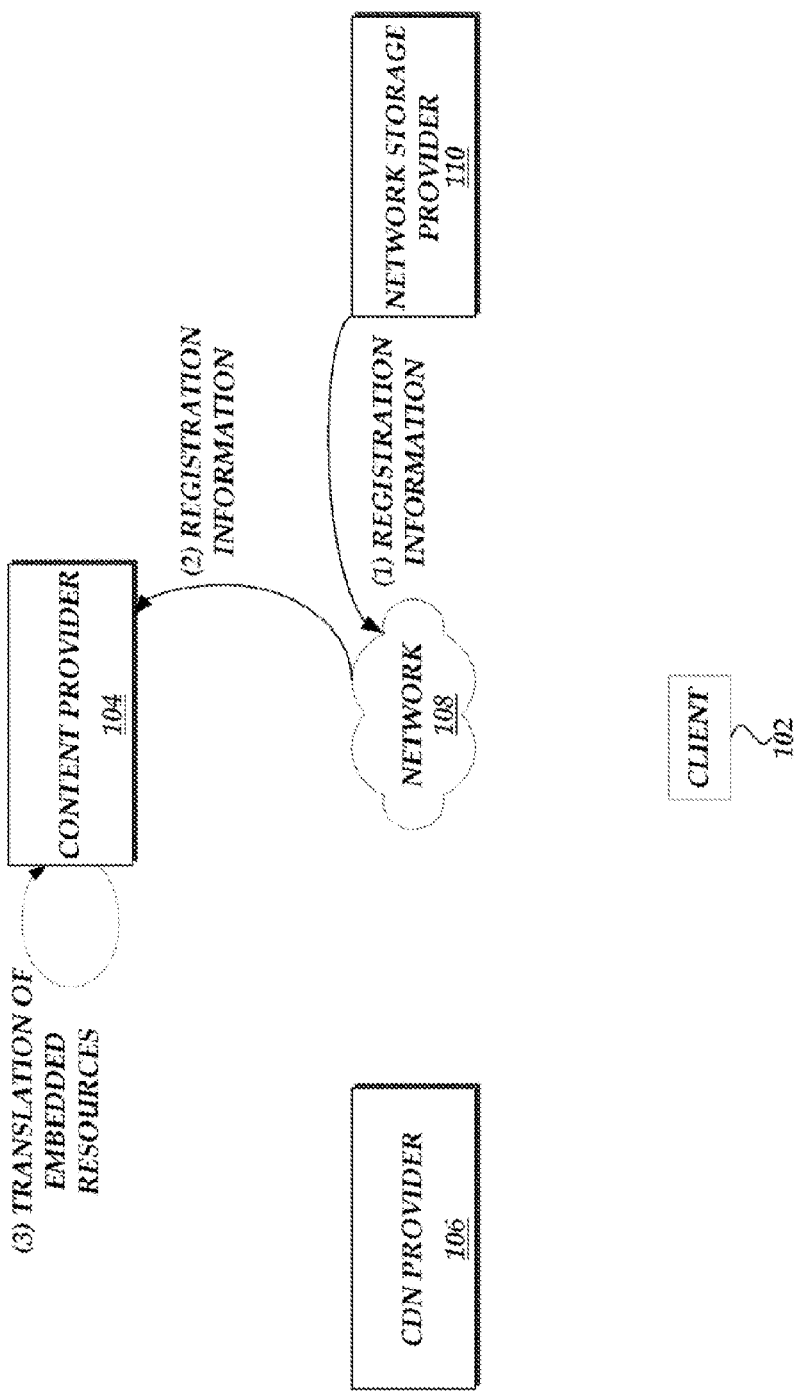
FIG. 4A is a block diagram of the content delivery environment of FIG. 1 illustrating one embodiment of the processing of resultant CDN registration information.

In turn, with reference now to FIG. 4A, in one illustrative embodiment, the network storage provider 110 can then send a request to the content provider 104 to process the stored content with CDN provider specific information. In one example, as illustrated in FIG. 4A, the content provider 104 translates resource identifiers currently directed toward a domain of the network storage provider 110 to a domain corresponding to the CDN service provider 106. The translated URLs are embedded into requested content in a manner such that DNS queries for the translated URLs will resolve to a DNS server corresponding to the CDN service provider 106 and not a DNS server corresponding to the network storage provider 110. Although the translation process is illustrated in FIG. 4A, in some embodiments, the translation process may be omitted in a manner described in greater detail below.

Generally, the identification of embedded resources currently directed to the network storage provider 110 will be in the form of an embedded resource identifier that can be processed by the client computing device 102, such as through a browser software application. As similarly set forth above, in an illustrative embodiment, the embedded resource identifiers can be in the form of a uniform resource locator ("URL"). Because one or more resources are currently associated with the network storage provider 110, the corresponding embedded resource identifiers can be referred to generally as the "network storage provider URL." For purposes of an illustrative example, the network storage provider URL can identify a domain of the network storage provider 110 (e.g., storageprovider.com), a name of the resource to be requested (e.g., "resource.xxx") and a path where the resource will be found (e.g., "path"). In this illustrative example, the network storage provider URL has the form of:

http://www.storageprovider.com/path/resource.xxx

During an illustrative translation process, the network storage provider URL is modified such that requests for the resources associated with the further translated URLs resolve to a POP associated with the CDN service provider 106. In one embodiment, the translated URL identifies the domain of the CDN service provider 106 (e.g., "cdnprovider.com"), the same name of the resource to be requested (e.g., "resource.xxx") and the same path where the resource will be found (e.g., "path"). Additionally, the translated URL can include additional processing information (e.g., "additional information"). The translated URL would have the form of:

http://additional_information.cdnprovider.com/path/resource.xxx

Figure 4B:
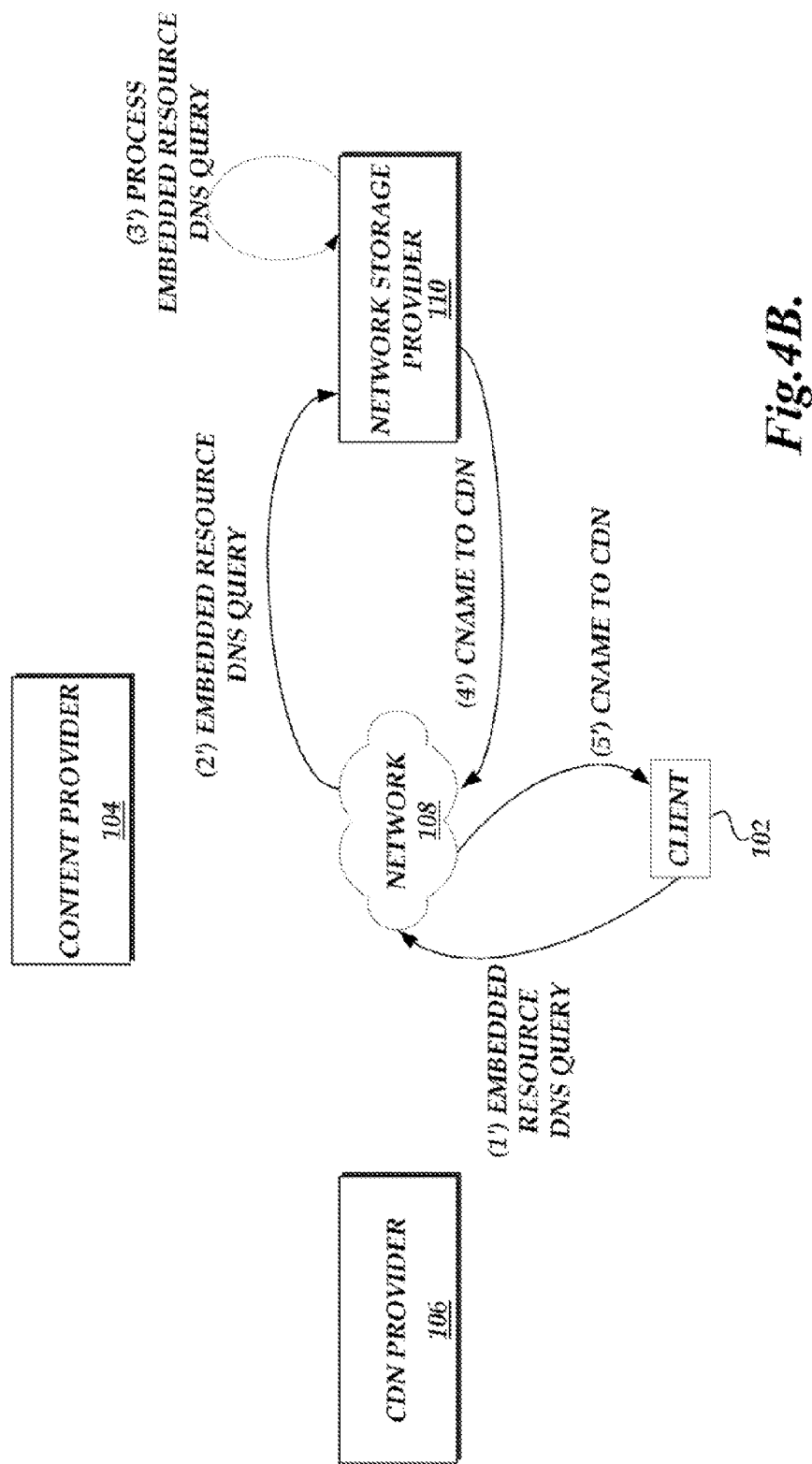
FIG. 4B is a block diagram of the content delivery environment of FIG. 1 illustrating another embodiment of the processing of resultant CDN registration information.

In another embodiment, the information associated with the CDN service provider 106 is included the modified URL, such as through prepending or other techniques, such that the translated URL can maintain all of the information associated with the original URL. In this embodiment, the translated URL would have the form of:

http://additional_information.cdnprovider.com/www.storageprovider.com/path/resource.xxx With reference now to FIG. 4B, another embodiment of processing information as a result of registering one or more resources with the CDN provider 106 will be described. Instead of requesting the content provider 104 to translate one or more embedded resources to be provided by the CDN service provider 106 as described in reference to FIG. 4A, the network storage provider 110 may alternatively process CDN registration information from the CDN service provider 106 itself such that the network storage provider 110 would provide an alternative resource identifier responsive to a received client request for an embedded resource to the CDN service provider 106. Specifically, instead of providing an embedded resource from a storage component 140, 144, 148 of the network storage provider 110 upon receiving a request from a client computing device 102 for the embedded resource, the network storage provider 110 can maintain sets of various alternative resource identifiers based on CDN registration information received from the CDN service provider 106. The alternative resource identifiers can be provided by the network storage provider 110 to the client computing device 102 such that a subsequent DNS query on the alternative resource identifier will resolve to a DNS server component within the CDN service provider's network. In this embodiment, a DNS name server associated with the network storage provider 110 (directly or indirectly) is able to receive the DNS query (corresponding to the domain in the embedded resource). However, as discussed above, because the DNS name server does not provide a responsive IP address to the query, it is not considered authoritative to the DNS query. Instead, the network storage provider 110 selects (or otherwise obtains) an alternative resource identifier that is intended to resolve to an appropriate DNS server of the CDN service provider 106 based on a variety of criteria. For example, the network storage provider may select an alternative resource identifier based on a regional service plan or service level information obtained from the content provider. As will be described further below, this additional information may also be used for further request routing.

In an illustrative embodiment, the alternative resource identifiers are in the form of one or more canonical name ("CNAME") records. In one embodiment, each CNAME record identifies a domain of the CDN service provider 106 (e.g., "cdnprovider.com" or "cdnprovider-1.com"). As will be explained in greater detail below, the domain in the CNAME does not need to be the same domain found in original URL. Additionally, each CNAME record includes additional information, such as request routing information, (e.g., "request routing information"). An illustrative CNAME record can have the form of:

request_routing_information.cdnprovider.com

In accordance with an illustrative embodiment, the network storage provider 110 maintains a data store that defines CNAME records for various URLs corresponding to embedded resources stored by the network storage provider 110. If a DNS query corresponding to a particular URL matches an entry in the data store, the network storage provider 110 returns a CNAME record to the client computing device 102 as defined in the data store and as illustrated in FIG. 4B.

The returned CNAME can also include request routing information that is different from or in addition to the information provided in URL of the current DNS query. For example, if the CNAME selection is based on a regional service plan or a service level plan selected by the content provider 104, a specific identifier can be included in the "request_routing_information" portion of the specific CNAME record. In another embodiment, request routing information can be found in the identification of a CDN service provider 106 domain different from the domain found in the original URL. For example, if the CNAME is based on a regional plan, a specific regional plan domain (e.g., "cdnprovider-region1.com") could be used in the domain name portion of the specific CNAME record. Any additional request routing information can be prepended to the existing request routing information in the original URL such that the previous request routing information would not be lost (e.g., http://serviceplan.regionalplan.cdnprovider.com). One skilled in the relevant art will appreciate that additional or alternative techniques and/or combination of techniques may be used to include the additional request routing information in the CNAME record that is identified by the network storage provider 110.

On another illustrative embodiment, prior to redirecting client DNS queries for embedded resources to the CDN service provider 106, the network storage provider 110 may also request that the content provider 104 modify the original resource identifiers so that subsequent client requests for the embedded resources are directed to the network storage provider 110 using a non-circular resource identifier.

With reference now to FIG. 5, one embodiment of a routine 500 implemented by the network storage provider 110 for managing registration of one or more resources stored on behalf of a content provider 104 with a CDN service provider 106 will be described. One skilled in the relevant art will appreciate that actions/steps outlined for routine 500 may be implemented by one or many computing devices/components that are associated with the network storage provider 110. Accordingly, routine 500 has been logically associated as being generally performed by the network storage provider 110, and thus the following illustrative embodiments should not be construed as limiting.

At block 502, the network storage provider 110 optionally obtains a CDN inquiry from a content provider 104 on behalf of which the network storage provider 110 hosts content. The CDN inquiry requests initial information regarding the potential use of a CDN service provider 106 to provide one or more resources on behalf of the content provider 104. In one embodiment, the content provider 104 may desire to register individual object files, such as those corresponding to embedded resources. In addition or alternatively, the content provider 104 may desire to register all objects associated with a resource, such as a particular domain.

In response to the CDN inquiry or even without requiring an initial CDN inquiry, the network storage provider 110 causes a user interface for registering one or more resources with a CDN service provider 106 to be generated at block 504. The network storage provider 110 accordingly obtains information to be provided as a part of the CDN registration user interface. For example, in one portion of the user interface, the network storage provider 110 may provide, and hence obtain, an identification of one or more resources currently hosted by the network storage provider 110 on behalf of the content provider 104, such as an embedded resource name, an embedded resource type, a current domain associated with the embedded resource, a size of the embedded resource, and the like. The network storage provider 110 may also obtain and provide additional information in the user interface, such as a number of times each of the one or more resources has been requested by a client computing device 102, a recommended CDN provider, an option to select one or more available CDN service providers, one or more options corresponding to CDN selection criteria such as a regional service plan or a service level plan, and the like. Even further, the CDN registration user interface includes a CDN selection component that provides a content provider an option to initiate publication of the one or more resources to a CDN service provider.

In one illustrative embodiment, rather than obtaining an initial CDN inquiry from a content provider 104, the network storage provider 110 may determine that a recommendation to use a CDN to provide a particular resource should be provided. Based on this determination, the network storage provider 110 would cause the CDN registration user interface to be generated. For example, the network storage provider 110 may monitor the volume of requests for each resource. If an embedded resource, such as one with a relatively large file size, has been requested a high number of times, the network storage provider 110 may determine that this embedded resource is a candidate for being provided by a CDN service provider and accordingly generate a corresponding recommendation.

In another illustrative embodiment, the network storage provider 110 can determine whether to make a CDN recommendation based on a variety of criteria, such as cost to the content provider, quality of service, throughput, content provider contractual obligations, latency, internet weather, and the like. Even further, the network storage provider 110 can utilize a web service to determine whether to make a particular CDN recommendation. For example, the network storage provider 110 can utilize the testing system disclosed in U.S. patent application Ser. No. 12/240,740, titled "Service Provider Optimization of Content Management" and hereby incorporated by reference, to make CDN recommendations. Yet further, in other embodiments, the network storage provider 110 can recommend registration with one or more CDN service providers.

Continuing with FIG. 5, at block 506, the network storage provider 110 obtains CDN provider registration information from the content provider 104. The CDN provider registration information includes a request from the content provider 104 to publish one or more resources to a CDN service so that the CDN service provider 106 provides the one or more resources on behalf of the content provider 104. The CDN provider registration information can also include other information obtained from the content provider 104 such as an identification of a particular CDN service provider, a select regional plan, a select service level plan, and the like. The network storage provider 110 also obtains any additional CDN provider registration information, whether from the content provider or otherwise, which may be needed to register the one or more resources with the CDN service provider. The additional CDN provider registration information may include an identification of the one or more resources requested to be published to a CDN service, content provider billing information, network storage provider billing information, and the like. As similarly set forth above, the identification information associated with the one or more resources may include anyone or more of the embedded resource name, the embedded resource type, the current domain, the size of the embedded resource, and the like. In one illustrative embodiment, the network storage provider 110 obtains all CDN provider registration information necessary to register the one or more resources with the CDN service provider 106 on behalf of the content provider 104 in a single request.

Next, at block 508, the network storage provider 110 transmits a CDN generation request associated with the obtained CDN registration information to the CDN service provider 106. At block 510, the network storage provider 110 then processes data corresponding to the resultant registration of the one or more resources with the CDN service provider. In one illustrative embodiment, the network storage provider 110 requests or otherwise causes the content provider 104 to modify one or more resource identifiers corresponding to the one or more resources so that subsequent requests for the one or more resources are directed to the CDN service provider 106. In an alternative embodiment, the network storage provider 110 obtains an alternative resource identifier corresponding to each of the one or more resources so that the network storage provider 110 can redirect client requests for the one or more resources to the CDN service provider 106. In either of the foregoing embodiments, the network storage provider 110 may also notify the content provider 104 that the one or more resources have been registered with the CDN service provider 106. The routine 500 ends at block 512.

Although many of the above described embodiments disclose use a user interface and receive input responsive to human interaction, the content provider 104 and the network storage provider 110 may interact via a series of API calls. In such embodiments, the content provider 104 or the network storage provider 110 may programmatically process the APIs, e.g., in accordance with defined business rules or other logic such that additional human interaction is not necessary. Accordingly, the present application should not be limited to use of a user interface. For example, rather than generating a user interface at block 504, the network storage provider 110 may generate an API call to the content provider 104 similarly requesting a determination be made regarding whether a CDN service provider should be used to host content on behalf of the content provider 104. Likewise, the content provider 104 can automatically process the API and return information to the network storage provider 110.

Figure 6:
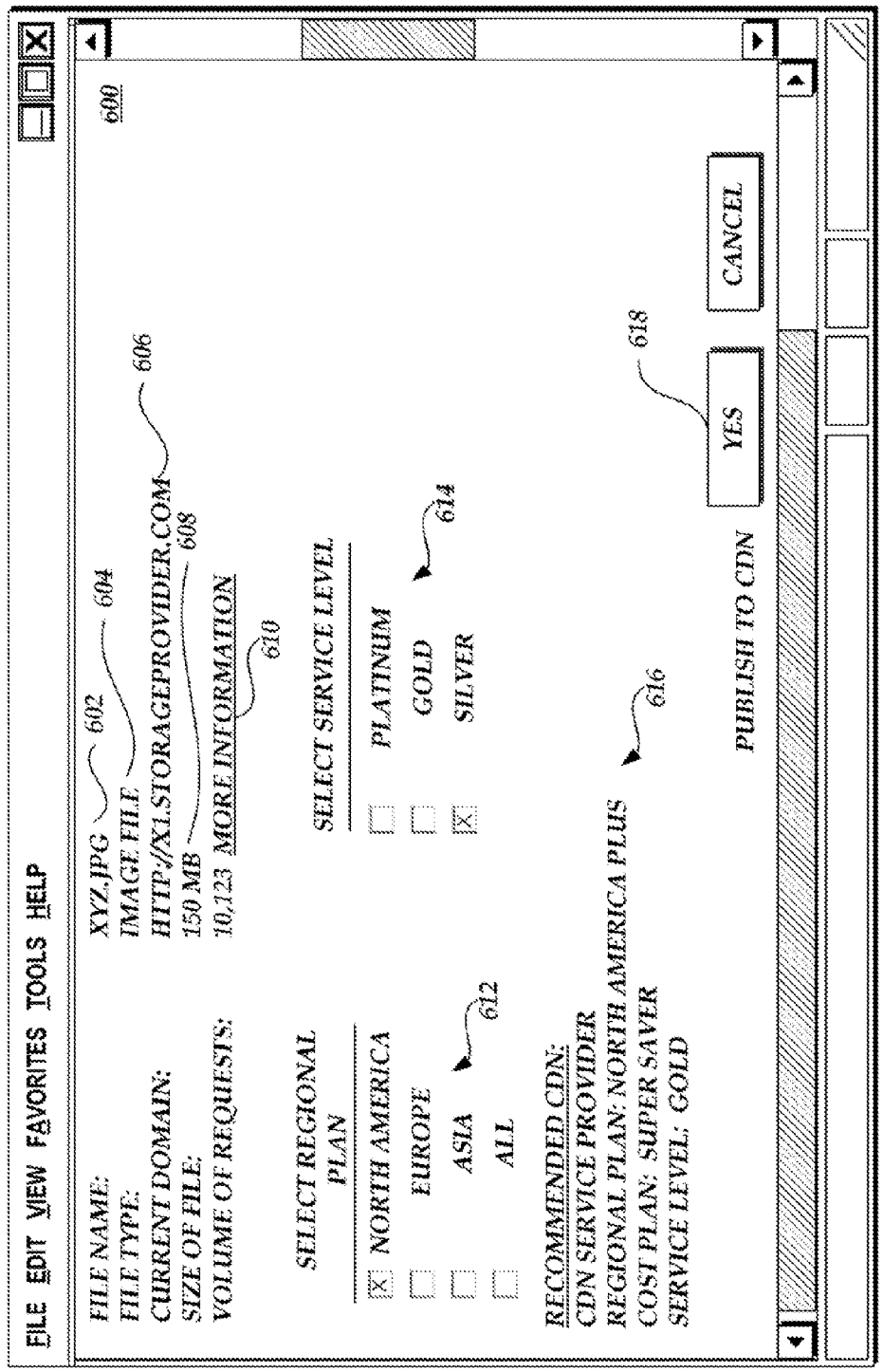
FIG. 6 is an illustrative user interface displaying information for use in registering with a content delivery network service provider.

With reference now to FIG. 6, one illustrative embodiment of a user interface or screen display 600 in which information for registering one or more resources with a CDN service provider 106 will now be described. In this illustrative embodiment, the screen display 600 is a Web page illustrating a presentation of content regarding the potential registration of a particular resource with a CDN service provider 106. The screen display 600 includes a CDN selection component 618 which when selected causes a request to register the identified resource with a CDN service provider 106 to be sent to the network storage provider 110. In one embodiment, with respect to a particular embedded resource, the screen display 600 also includes information identifying the embedded resource, such as an embedded resource name 602, an embedded resource type 604, a current domain associated with the embedded resource 606, and a size of the embedded resource 608. The screen display 600 further includes information identifying a number of times the embedded resource has been requested from the network storage provider 110, as well as a link 610 corresponding to an identifier that when selected provides more detailed information regarding client requests for the embedded resource. In another embodiment, where the resource corresponds to a domain of the content provider, the screen display 600 could also similarly include information associated with the domain, such as a domain identification, a number of requests associated with the domain, a number of embedded resources associated with the domain, and the like.

In another portion of the screen display 600, CDN selection criteria are provided. For example, a regional plan selection component 612 and a service level selection component 614 are provided to allow the content provider 104 to select desired parameters associated with a CDN service provider 106. Finally, the display screen 600 includes a specific CDN service provider recommendation 616 generated by the network storage provider 110. As similarly set forth above, the recommendation may identify one or more CDN service providers for hosting content on behalf of the content provider.

It will be appreciated by those skilled in the art and others that all of the functions described in this disclosure may be embodied in software executed by one or more processors of the disclosed components and mobile communication devices. The software may be persistently stored in any type of non-volatile storage.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached Figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storing the computer executable components such as a CD-ROM, DVD-ROM, or network interface further, the component and/or data can be included in a single device or distributed in any manner. Accordingly, general purpose computing devices may be configured to implement the processes, algorithms and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method comprising:
as implemented by one or more computing devices including a processor and a memory and corresponding to a network storage provider, the network storage provider hosting resources on behalf of a content provider, and the one or more computing devices configured with specific executable instructions:
obtaining registration information at the network storage provider for registering, by the network storage provider, one or more resources associated with the content provider with a content delivery network (CDN) service provider; and
transmitting a CDN generation request from the network storage provider to a CDN service provider, the CDN generation request corresponding to the registration information.

2. The computer-implemented method as recited in claim 1, wherein the one or more resources correspond to one or more embedded resources.

3. The computer-implemented method as recited in claim 1, wherein the registration information includes identification of the one or more resources to be provided by a CDN service provider and CDN selection criteria provided by the content provider.

4. The computer-implemented method as recited in claim 1 further comprising obtaining, at the network storage provider, an alternative resource identifier corresponding to each of the one or more resources, wherein the alternative resource identifier corresponds to an identification of a CDN service provider for providing the associated resource.

5. The computer-implemented method as recited in claim 1 further comprising causing generation of a user interface for registering the one or more resources with a CDN service provider.

6. The computer-implemented method as recited in claim 5 further comprising processing data corresponding to the registration of the one or more resources with a CDN service provider.

7. The computer implemented method as recited in claim 6, wherein processing data corresponding to the registration of the one or more resources with a CDN service provider comprises notifying the content provider of the registration of the one or more resources with a CDN service provider without receiving a request from the content provider for the notification.

8. The computer implemented method as recited in claim 6, wherein processing data corresponding to the registration of the one or more resources with a CDN service provider comprises sending a request from the network storage provider for the content provider to modify one or more resource identifiers corresponding to the one or more resources so that subsequent requests for the one or more resources are directed to a CDN service provider.

9. The computer implemented method as recited in claim 6, wherein processing data corresponding to the registration of the one or more resources with a CDN service provider comprises obtaining an alternative resource identifier corresponding to each of the one or more resources, wherein the alternative resource identifier corresponds to an identification of a CDN service provider for providing the associated resource.

10. The computer-implemented method as recited in claim 6, wherein the user interface provides an option for a content provider to select to register with a CDN service provider by selection of a single control.

11. The computer-implemented method as recited in claim 6, wherein the one or more resources are hosted by the network storage provider on behalf of a content provider and wherein the user interface includes an option for the content provider to have the one or more resources hosted by a CDN service provider in the alternative to the network storage provider.

12. The computer implemented method of claim 6, wherein the user interface provides identification of a number of times each of the one or more resources has been requested by a client computing device.

13. The computer-implemented method as recited in claim 1 further comprising causing generation of an API call for registering the one or more resources with a CDN service provider.

14. A non-transitory, computer-readable storage medium comprising one or more computer-executable components, the one or more computer-executable components configured to be executed by one or more processors of a computer system to cause the computer system to:
  obtain registration information at the network storage provider for registering, by the network storage provider, one or more resources associated with the content provider with a content delivery network (CDN) service provider; and
  transmit a CDN generation request from the network storage provider to a CDN service provider, the CDN generation request corresponding to the registration information.

15. The computer-readable storage medium as recited in claim 14, wherein the one or more resources correspond to one or more embedded resources.

16. The computer-readable storage medium as recited in claim 14, wherein the registration information includes identification of the one or more resources to be provided by a CDN service provider and CDN selection criteria provided by the content provider.

17. The computer-readable storage medium as recited in claim 14, wherein the one or more computer-executable components are further configured to be executed by one or more processors of a computer system to cause the computer system to cause generation of a user interface for registering the one or more resources with a CDN service provider.

18. The computer-readable storage medium as recited in claim 17, wherein the one or more computer-executable components are further configured to be executed by one or more processors of a computer system to cause the computer system to process data corresponding to the registration of the one or more resources with a CDN service provider.

19. The computer-readable storage medium as recited in claim 18, wherein processing data corresponding to the registration of the one or more resources with a CDN service provider comprises notifying the content provider of the registration of the one or more resources with a CDN service provider without receiving a request from the content provider for the notification.

20. The computer-readable storage medium as recited in claim 18, wherein processing data corresponding to the registration of the one or more resources with a CDN service provider comprises sending a request from the network storage provider for the content provider to modify one or more resource identifiers corresponding to the one or more resources so that subsequent requests for the one or more resources are directed to a CDN service provider.

21. The computer-readable storage medium as recited in claim 18, wherein processing data corresponding to the registration of the one or more resources with a CDN service provider comprises obtaining an alternative resource identifier corresponding to each of the one or more resources, wherein the alternative resource identifier corresponds to an identification of a CDN service provider for providing the associated resource.

22. The computer-readable storage medium as recited in claim 17, wherein the user interface provides an option for a content provider to select to register with a CDN service provider by selection of a single control.

23. The computer-readable storage medium as recited in claim 17, wherein the one or more resources are hosted by the network storage provider on behalf of a content provider and wherein the user interface includes an option for the content provider to have the one or more resources hosted by a CDN service provider in the alternative to the network storage provider.

24. The computer-readable storage medium of claim 17, wherein the user interface provides identification of a number of times each of the one or more resources has been requested by a client computing device.

25. The computer-implemented method as recited in claim 14, wherein the one or more computer-executable components are further configured to be executed by one or more processors of a computer system to cause the computer system to cause generation of an API call for registering the one or more resources with a CDN service provider.

* * * * *